United States Patent
Tamashima

(10) Patent No.: US 8,922,823 B2
(45) Date of Patent: Dec. 30, 2014

(54) INFORMATION PROCESSING APPARATUS AND STORAGE MEDIUM WITH THE FUNCTION OF ADDING A COVER LETTER TO A PRINT JOB

(71) Applicant: Daisuke Tamashima, Kanagawa (JP)

(72) Inventor: Daisuke Tamashima, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 70 days.

(21) Appl. No.: 13/826,443

(22) Filed: Mar. 14, 2013

(65) Prior Publication Data
US 2013/0242348 A1 Sep. 19, 2013

(30) Foreign Application Priority Data
Mar. 19, 2012 (JP) ................................. 2012-062742

(51) Int. Cl.
G06K 15/00 (2006.01)
H04N 1/23 (2006.01)
H04N 1/21 (2006.01)
H04N 1/00 (2006.01)

(52) U.S. Cl.
CPC ............ *H04N 1/21* (2013.01); *H04N 1/00206* (2013.01); *H04N 2201/0067* (2013.01); *H04N 2201/0094* (2013.01)
USPC .......................................... 358/1.16; 358/400

(58) Field of Classification Search
None
See application file for complete search history.

(56) References Cited

U.S. PATENT DOCUMENTS

| | | | | |
|---|---|---|---|---|
| 5,784,177 A | * | 7/1998 | Sanchez et al. | 358/468 |
| 2008/0186535 A1 | * | 8/2008 | Maeda et al. | 358/1.15 |
| 2012/0140249 A1 | | 6/2012 | Tamashima | |
| 2012/0203940 A1 | | 8/2012 | Nishihara et al. | |
| 2012/0307275 A1 | | 12/2012 | Tamashima | |

FOREIGN PATENT DOCUMENTS

JP 2010-066876 3/2010

* cited by examiner

*Primary Examiner* — Benny Q Tieu
*Assistant Examiner* — Sunil Chacko
(74) *Attorney, Agent, or Firm* — IPUSA, PLLC

(57) ABSTRACT

A non-transitory computer-readable recording medium stores programs for a computer to execute a method of controlling a print job of a document from an application. The programs includes a controlling program to control the print job with a job ID, a setting receiving program to receive a setting condition, an image processing program to convert the document into print data, and a print data processing program to store the job ID with image data. The method includes the steps of obtaining the job ID, generating the image data, and storing the job ID with the image data into the print data processing program, executed by the setting receiving program, and the steps of obtaining the document and the job ID, receiving the image data, and converting the image data and the document into the print data, executed by the image processing program.

16 Claims, 24 Drawing Sheets

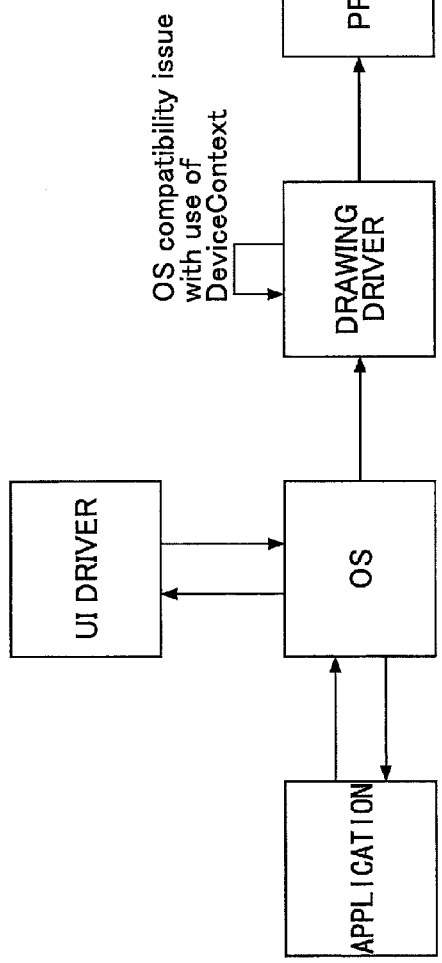
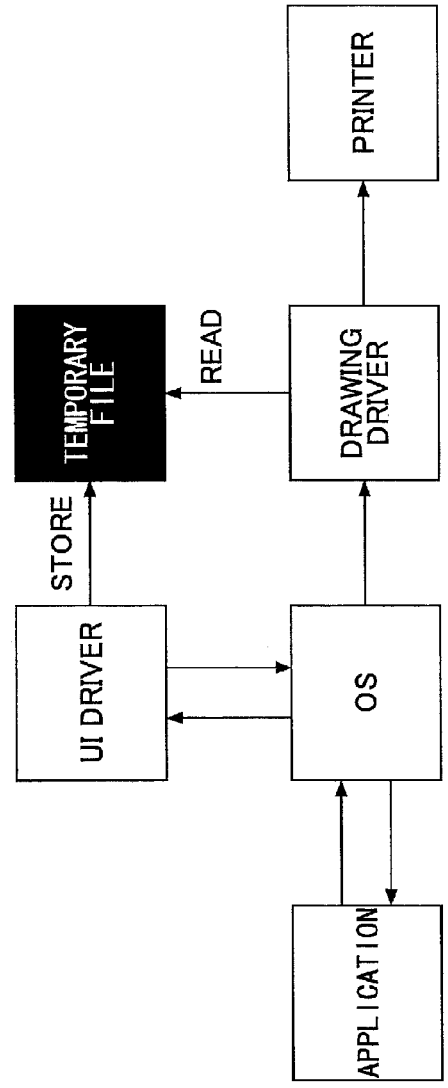
FIG.3
PRIOR ART
FIG.4
PRIOR ART

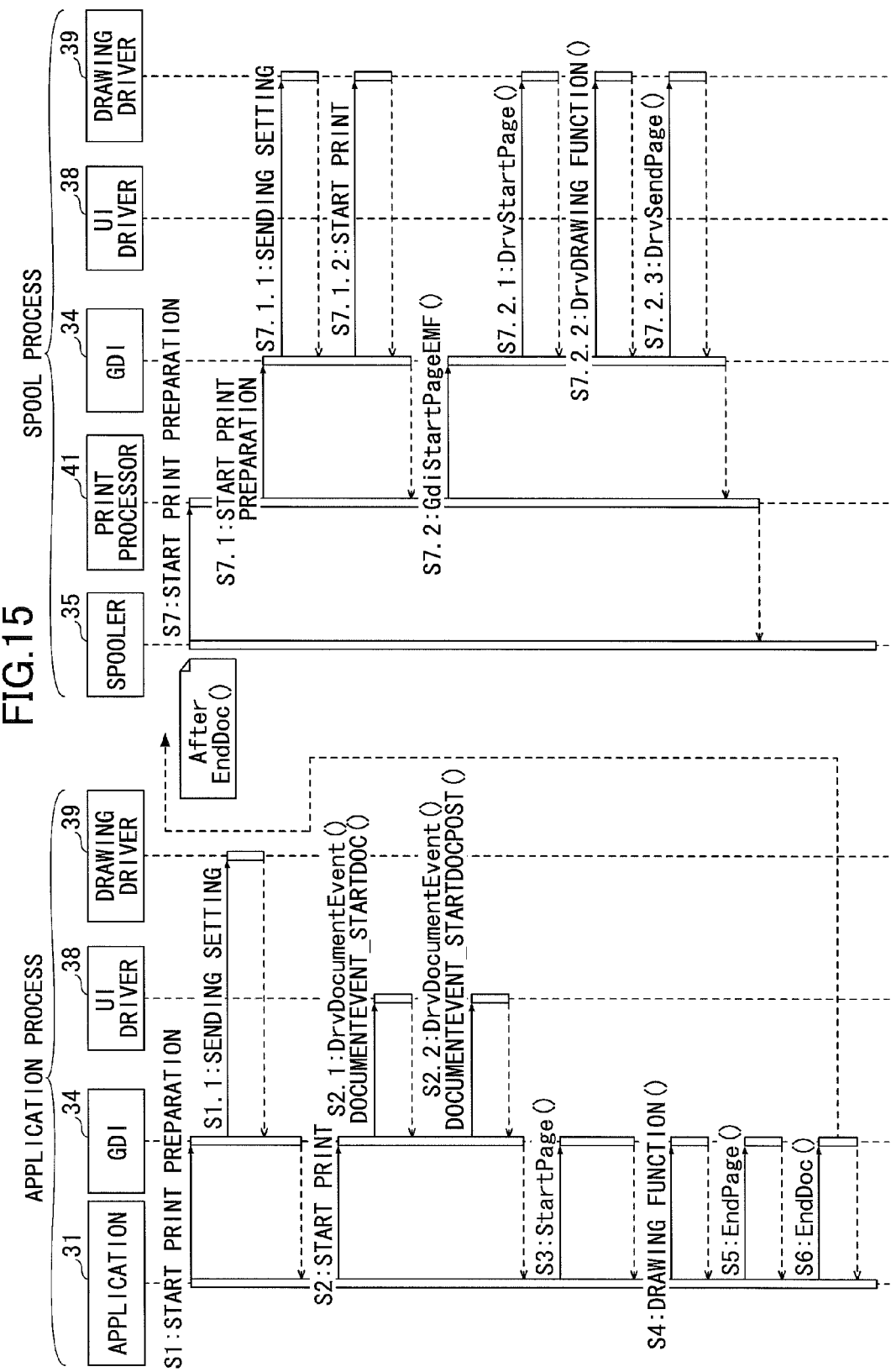

```
int ExtEscape(
    HDC hdc,              // handle to DC
    int nEscape,          // escape function
    int cbInput,          // size of input structure
    LPCSTR lpszInData,    // input structure
    int cbOutput,         // size of output structure
    LPSTR lpszOutData,    // output structure
);
```

```
INT
DrvDocumentEvent(
    HANDLE  hPrinter,
    HDC  hdc,
    int  iEsc,
    ULONG  cbIn,
    PVOID  pvIn,
    ULONG  cbOut,
    PVOID  pvOut
);
```

FIG.17A

```
DWORD WINAPI
SendRecvBidiDataFromPort(
    HANDLE hport,
    DWORD dwAccessBit,
    LPCWSTR pAction,
    PBIDI_REQUEST_CONTAINER  pReqData,
    PBIDI_RESPONSE_CONTAINER *ppResData
);
```

FIG.17B

```
typedef struct _BIDI_REQUEST_CONTAINER {
    DWORD    Version;
    DWORD    Flags;
    DWORD    Count;
    BIDI_REQUEST_DATA aData[1];
} BIDI_REQUEST_CONTAINER, *PBIDI_REQUEST_CONTAINER,
  *LPBIDI_REQUEST_CONTAINER;
```

FIG.18A

```
typedef struct _BIDI_REQUEST_DATA {
    DWORD    dwReqNumber;
    LPWSTR   pSchema;
    BIDI_DATA data;
} BIDI_REQUEST_DATA, *PBIDI_REQUEST_DATA, *LPBIDI_REQUEST_DATA;
```

FIG.18B

INFORMATION PROCESSING APPARATUS AND STORAGE MEDIUM WITH THE FUNCTION OF ADDING A COVER LETTER TO A PRINT JOB

BACKGROUND OF THE INVENTION

1. Field of the Invention

The disclosures herein generally relate to an information processing apparatus that runs a program having a step to display and receive a print setting condition, and a step to convert document data into print data.

2. Description of the Related Art

It is possible to send document data generated by an application on a personal computer by a facsimile machine. In such a case, the application calls a printer driver (precisely, it is a PC-fax driver, although it is called a printer driver here because there are a lot of common operations) that exchanges data with the facsimile machine so that a user can set an address or the like.

The printer driver provides a function to add a cover letter. Here, a cover letter is a sheet on which a sender, an address, etc., of the document data to be sent are explicitly designated, which is generated independently from the document data.

FIG. 1 is a schematic view illustrating an example of a cover letter. Here, a company name, a division name, a receiver's name, or the like are shown below the line of "To", and a company name, a division name, a sender's name, a telephone number, a fax number, or the like are shown below the line of "From".

If the function to add a cover letter is enabled when setting sending parameters of the printer driver, the printer driver starts a sending job by generating a cover letter data, then prints the cover letter data, and finally prints the document data. Thus, the cover letter is sent as a cover sheet of the document data.

However, it has been considered difficult for a user to set an address or the like after the user has started a fax sending job. To tackle this problem, several techniques have been proposed (see, for example, Japanese Laid-open Patent Application No. 2010-066876).

<Mechanisms for Printing on a Windows OS>

To explain conventional techniques, mechanisms for printing on a Windows (trademark) OS will be described first. As mechanisms for printing on a Windows OS, there are two spool formats, one is RAW spool format, the other is EMF spool format.

With RAW spool format, an application process executes a printing operation in which printing data from the application is converted to data that can be interpreted by a printer. From a user's point of view, the user cannot operate the application until the printing operation is completed.

With EMF spool format, an application process converts print data from the application to a device-independent EMF data format (intermediate data) to spool. And then, a spooler process executes a printing operation in which the EMF data spooled by the application process is converted to data that can be interpreted by a printer. From a user's point of view, the user can operate the application after the conversion to the EMF data by the application process is completed.

<Point & Print>

For a printer driver working on a Windows OS, there is an install format for a printer driver, called Point & Print.

FIG. 2 is a schematic view illustrating Point & Print. In a system in which a printer, a server PC, and a client PC are connected with each other via a network, Point & Print can be used for the client PC to execute a print job on the printer by using the server PC as a print server.

In such a system, the client PC needs to have the same printer driver installed as the server PC. It takes a lot of time and labor to install the printer driver on each of individual client PCs on a network.

Point & Print is a solution to this inconvenience, which is a mechanism for downloading and installing a printer driver from a server PC to client PCs. Point & Print is one of the standard functions of a Windows OS.

Having installed the printer driver on a client PC with Point & Print, a user can set whether a drawing operation is executed on a client PC or a server PC. Executing a drawing operation on a client PC is called client-side rendering, whereas executing a drawing operation on a server PC is called server-side rendering.

For a printer driver installed by Point & Print, there are RAW spool format and EMF spool format for printing.

Having described the background as above, three techniques that make it possible for a user to set an address or the like after starting to send a fax will be described below. However, each of the three techniques has its own problems.

1. Method for Adding Cover Letter Data by Drawing Driver

FIG. 3 is a schematic view illustrating a method for adding cover letter data by a drawing driver. A UI (User Interface) driver displays a screen for setting printing conditions before starting a print job, to receive the setting of printing conditions from a user. The drawing driver generates image data from document data reflecting the setting.

By adding cover letter data by the drawing driver, it is possible to add a cover letter when printing with RAW spool, EMF spool, and a printer driver installed by Point & Print. Here, the drawing driver has added a function to display a screen to receive the setting of printing conditions.

However, to add a cover letter data, the drawing driver needs to make a request to an OS with GDI (Graphic Device Interface) calls, such as TextOut( ) for drawing characters or the like. When the drawing driver operates, it operates under the system privilege of an OS. Therefore, making a GDI call may lower compatibility of the driver among OSes because some OSes may not receive a GDI call requiring the system privilege.

2. Method for Adding Cover Letter Data using DrvDocumentEvent( ) of DDI (Device Driver Interface) Provided with the UI Driver FIG. 4 is a schematic view illustrating a method for adding cover letter data by a UI driver. In FIG. 4, the UI driver generates cover letter data with DrvDocumentEvent( ), which is stored in a file or a memory to be printed by the drawing driver.

Here, DrvDocumentEvent( ), a DDI of the UI driver, is used. In DrvDocumentEvent( ), a GDI is called. As the UI driver operates at the same privilege level as an application, compatibility is not reduced. However, the drawing driver and the UI driver are separate modules that cannot communicate directly with each other to exchange information, because a driver is basically just called by an OS through DDI.

Therefore, to exchange data between the UI driver and the drawing driver, a temporary file is used. The UI driver outputs generated cover letter data to a temporary file, and the drawing driver reads the temporary file, which makes it possible to exchange data between the UI driver and the drawing driver.

However, with this method using a temporary file, a file may not be output securely depending on an operation timing of a printer driver or a privilege level given to a user.

FIG. 5 is a schematic view illustrating a problem with using a temporary file. As shown in FIG. 5, in an environment where multiple applications are operating, there is a possibility that the setting written in a temporary file is overwritten. For example, cover letter data of an application 1 stored in the temporary file may be overwritten by another application 2 before the application 1 uses the stored data. From the viewpoint of the application 1, the content of the temporary file is changed after the cover letter data has been saved for the application 1 by the UI driver, before the drawing driver reads the content for sending the document data generated by the application 1.

To solve this problem, cover letter data may be saved in a print-setting storing module (for example, DEVMODE structure) instead of a temporary file.

However, even if using this method, there are two cases in which the problem cannot be solved:

2-1 Case with EMF spool
2-2 Case with a printer driver installed by Point & Print 2-1. Case with EMF Spool Whether the module for storing a print setting can be used depends on a DDI call sequence for printing. It is possible with RAW spool.

However, with EMF spool, the DDI call sequence from a Windows OS is different. With EMF spool, there are two print processing sequences as internal operations within an OS, one is a processing sequence to convert print data from an application to EMF data, the other is a processing sequence to convert the EMF data to data that can be interpreted by a printer. Thus, the DDI call sequence with EMF spool is more complex than the sequence with RAW spool, which makes it difficult to exchange cover letter data at expected timings.

2-2. Case with a Printer Driver Installed by Point & Print

The method using the print-setting storing module can be used in a local environment where a printer driver installed on a PC used by a user.

However, if the printer driver is installed by Point & Print, and the printer driver is operated with server-side rendering, the UI driver operates on the client PC whereas the drawing driver operates on the server PC.

Server-side rendering, in the first place, uses physically separated PCs, hence the print-setting storing module exists only on the client PC. In this case, cover letter data cannot be exchanged because the drawing driver cannot obtain the sending setting from the print-setting storing module.

3. Method for Adding Cover Letter Data to a Device Context Received with DrvDocumentEvent( ) in the UI Driver.

FIGS. 6A-6B are schematic views illustrating methods for adding cover letter data to a device context. In this method, the UI driver directly adds cover letter data to a device context received with DrvDocumentEvent( ). From the application point of view, the cover letter data is added by the UI driver just before an actual document printing, hence one page seems to be added to the original print document.

With this method, the problem with the above method 2 does not arise because there is no data exchange between the UI driver and the drawing driver.

However, this method has a problem with 64-bit Windows OSes. As shown in FIG. 6B, a 32-bit application can operate on a 64-bit OS. For running a 32-bit application on a 64-bit Windows OS, a 64-bit Windows OS provides a mechanism called WOW64 (Windows on Windows emulation subsystem). On the other hand, a part of the device driver operates in the kernel mode, so it is made 64-bit compliant as the 64-bit OS itself. When printing, a 64-bit Windows OS runs a process called splwow64.exe as a function of WOW64.

In this case, there exist two different device contexts, one is the device context generated by the language monitor 32-bit application, and the other is the device context of splwow64.exe to which the UI driver makes write operations. Therefore, the UI driver cannot receive cover letter data.

SUMMARY OF THE INVENTION

As described above, conventional methods have problems. It is a general object of at least one embodiment of the present invention to provide a program that can send a cover letter without losing compatibility with OSes, and without being affected by differences between spool formats, installing methods, and OSes.

According to at least one embodiment of the present invention, a non-transitory computer-readable recording medium has programs stored therein for causing a computer to execute a method of controlling a print job of document data generated by an application. The programs are a controlling program to control an execution of the print job of the document data generated by the application, by assigning an ID to the print job, a setting receiving program to display a screen for receiving a setting condition for the print job from a user, an image processing program to obtain the document data from the application to convert it into print data based on the setting condition received by the setting receiving section, and a print data processing program to store the ID of the print job associated with image data. The method includes the steps of (a) obtaining the ID of the print job from the controlling program, the step being executed by the setting receiving program, (b) generating the image data if a command for generating the image data is specified in the setting condition, the step being executed by the setting receiving program, (c) storing the ID of the print job associated with the image data into the print data processing program, the step being executed by the setting receiving program, (d) obtaining the document data from the application, and the ID from the controlling program, the step being executed by the image processing program, (e) receiving the image data associated with the ID stored in the print data processing program via the controlling program, the step being executed by the image processing program, and (f) converting the image data and the document data into the print data according to the setting condition, the step being executed by the image processing program.

According to at least one embodiment of the present invention, it is possible to provide a program that can send a cover letter without losing compatibility with OSes, and without being affected by differences between spool formats, installing methods, and OSes.

BRIEF DESCRIPTION OF THE DRAWINGS

Other objects and further features of embodiments will be apparent from the following detailed description when read in conjunction with the accompanying drawings:

FIG. 3 is a schematic view illustrating a method for adding cover letter data by a drawing driver;

FIG. 4 is a schematic view illustrating a method for adding cover letter data by a UI driver;

FIG. 15 is a sequence chart in the printing architecture of a Windows OS (EMF spool);

FIG. 17A is a schematic view illustrating a format of function DrvDocumentEvent( );

FIG. 17B is a schematic view illustrating a format of function SendRecvBidiDataFromPort( );

FIG. 18A is a schematic view illustrating a format of structure PBIDI_REQUEST_CONTAINER;

FIG. 18B is a schematic view illustrating a format of structure BIDI_REQUEST_DATA;

DESCRIPTION OF THE PREFERRED EMBODIMENTS

In the following, embodiments of the present invention will be described with reference to the drawings.

First Embodiment

Figure 7:
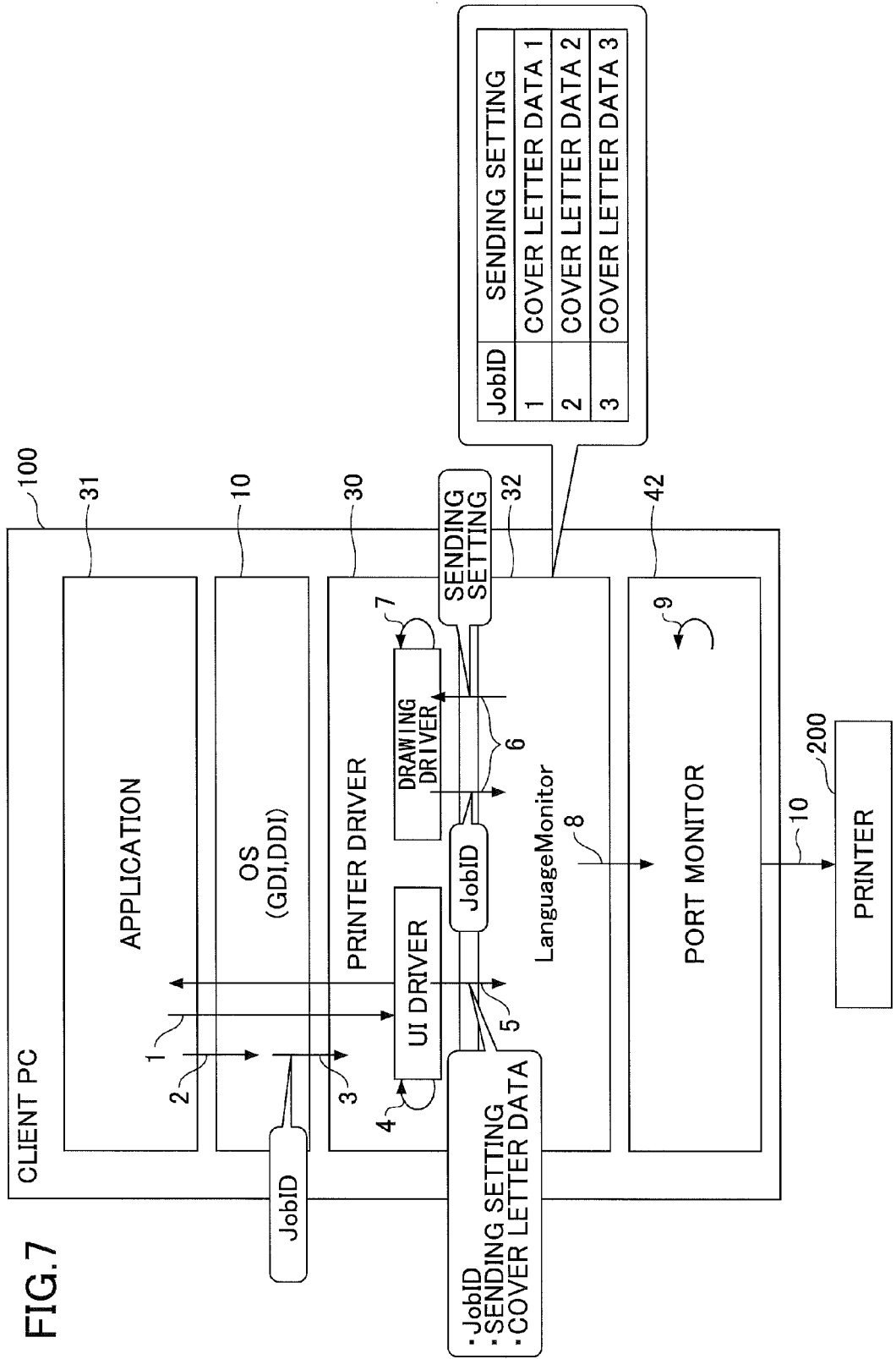
FIG. 7 is a schematic view illustrating general features of a printer driver according to an embodiment of the present invention.

FIG. 7 is a schematic view illustrating general features of a printer driver according to an embodiment of the present invention. In the present embodiment, behavior of a printer driver is taken as an example because a printer driver and a PC-fax driver have common internal behavior with a few differences in the user interface and a part of the functions. A printer driver and a PC-fax driver can be used as a device driver for a multi-function peripheral. Therefore, a printer driver may be called a PC-fax driver. In the following, an MFP is simply called a printer assuming that a printer has a fax function.

In FIG. 7, it is assumed that an application is running on a Windows OS installed on a personal computer. In the printing architecture of a Windows OS, document data from an application is processed by a drawing driver of a print driver, then sent to a printer, through layers of software shown in FIG. 7. Here, no distinction is made on spool formats.

Windows OSes for a client include Windows NT, Windows 98, Windows 2000, Windows Me, Windows XP, Windows Vista, Windows 7, Windows 8, and later versions of these OSes. Windows OSes for a server include Windows 2000 Server, 2003 Server, 2008 Server, and later versions of these OSes. In the present embodiment, a Windows OS is used preferably, although the OS is not limited to that, but any other OS that has equivalent functionalities as a Windows OS can be used.

Processing steps for sending data to the printer are as follows. As shown in FIG. 7, the printer driver in the present embodiment has one of its features in that the printer driver uses a language monitor and a job ID to send image data from the UI driver to the drawing driver.

It is noted that the term "print" used in the present embodiment as in "print architecture", "print start", "print processing", etc., means that the drawing driver executes the drawing process, which is used for a print job and a fax sending job. Therefore, the meaning of the term "print" does not necessarily mean printing on a sheet of paper by a printer.

1. Once a user starts a sending operation, an application calls the UI driver through a Windows OS. The user enters a sending setting including an address or the like, then presses an execution button.

2. The application calls a GDI API function of the Windows OS (to allocate a device context for the printer).

3. The Windows OS assigns a job ID to each sending job. The assigned job ID is indicated to the printer driver 30.

4. The UI driver creates cover letter data. The cover letter data is image data.

5. The UI driver indicates the cover letter data and the sending setting obtained from the application, and the job ID, to a language monitor 32. The sending setting can be stored in DEVMODE. Therefore, it may not necessarily be stored in the language monitor 32.

The language monitor 32 stores the cover letter data and the sending setting associated with the job ID generated by the Windows OS. The language monitor 32 manages the cover letter data and the sending setting using the job ID as a key. Therefore, these may not be overwritten by other applications.

6. When the drawing driver reads the sending setting and the cover letter data, it can obtain the sending setting and the cover letter data generated by the UI driver from the language monitor 32 by specifying the job ID. As above, the drawing driver can uniquely identify the cover letter data.

If using EMF spool in the printing architecture, the language monitor 32 is referred to with the job ID as a key in the two print processing sequences. Therefore, the sending setting and the cover letter data can be exchanged securely.

7. The drawing driver generates drawing data from document data and the sending setting (the cover letter data is already generated).

8. The language monitor 32 executes required operations.

9. A port monitor 42 outputs required data according to the type of a printer port (USB, TCP/IP, etc.).

10. The image data is sent to the printer.

Since the language monitor 32 is a function of the Windows OS, it is available on a server PC in a Point & Print environment. Therefore, the UI driver can access the language monitor 32 on the server PC using functions of the Windows OS, and can obtain the cover letter data (and the sending setting) specified with the job ID from the language monitor 32 when the drawing driver on the server PC executes the drawing process. As described above, management of the cover letter data in the present embodiment is effective in a Point & Print environment as well as in an environment where the printer driver 30 is locally installed.

In addition, if a 32-bit application runs on a 64-bit Windows OS, a 64-bit UI driver uses a language monitor 32 because a process of splwow64.exe operates when the 32-bit application starts a print job. Thus, a 64-bit drawing driver can access the language monitor 32 when creating a cover letter data.

Therefore, it is possible for the printer driver 30 in the present embodiment to send a cover letter without losing compatibility with OSes, and without being affected the by differences between spool formats (RAW spool, EMF spool), installing methods (local installation, Point & Print installation), and OSes (32-bit OS, 64-bit OS).

Conventionally, the language monitor 32 is just used as the interface to the port monitor 42. When using a Windows OS, the printer driver 30 can use either of the language monitor 32 provided by the OS, or a language monitor 32 provided by a manufacturer of a printer, a fax machine, or the like. In the present embodiment, either of the language monitor 32 provided with the OS, or the one provided by a manufacturer can be used.

Configuration Example

Figure 8A:
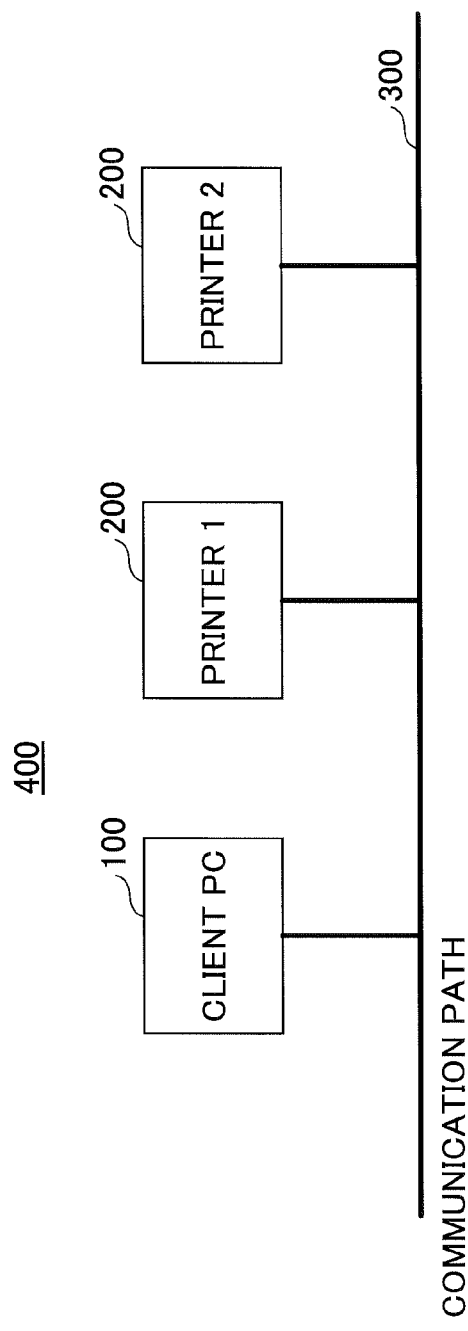
FIG. 8A is a general configuration diagram of a printing system.
Figure 8B:
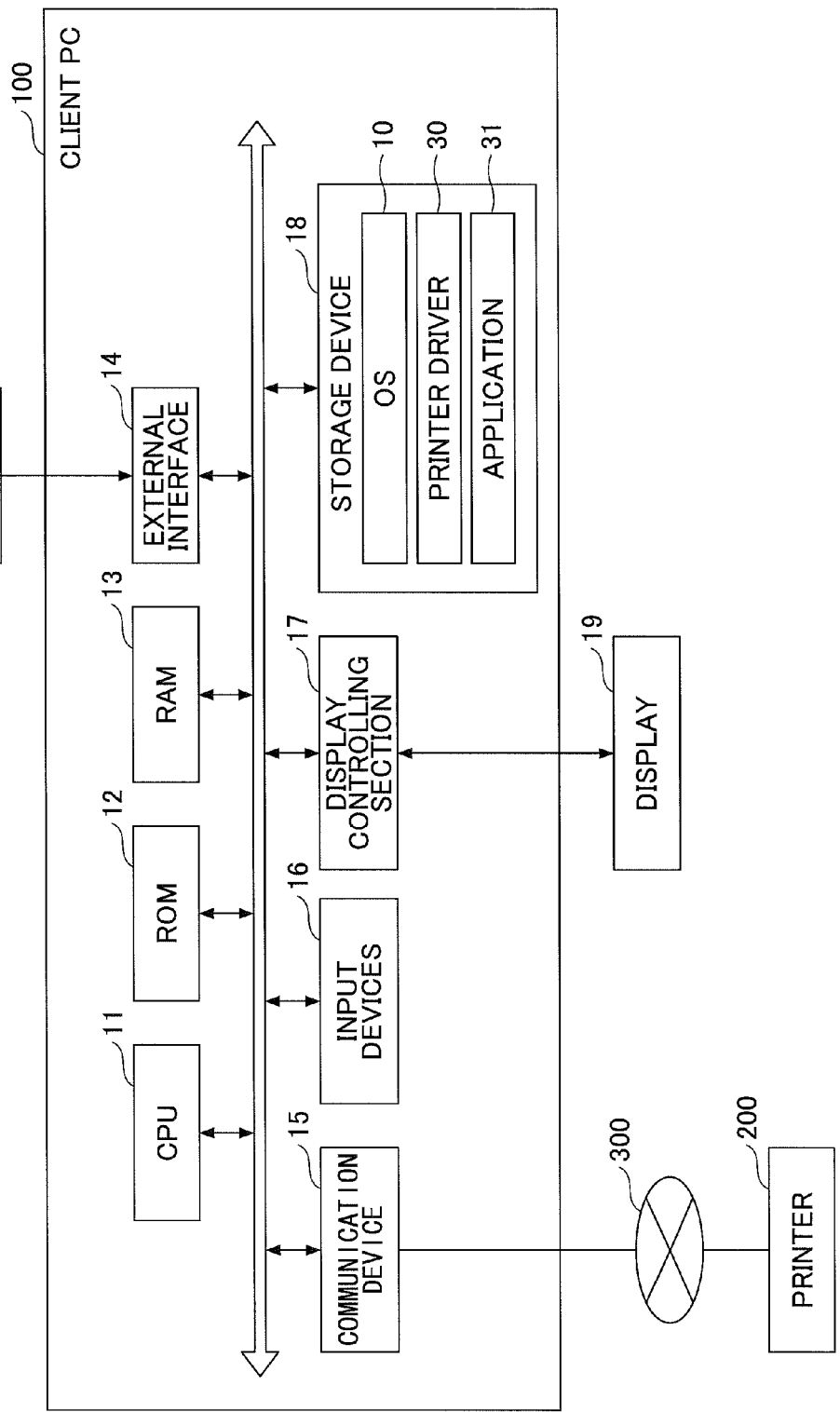
FIG. 8B is a hardware configuration diagram of a client PC.

FIG. 8A is a general configuration diagram of a printing system 400. FIG. 8B is a hardware configuration diagram of a client PC 100. The client PC 100 and printers 200 are connected with each other via a network 300. Another configuration with only one printer 200 is also possible.

The client PC 100 receives a user operation, and has an application, such as document creating software, which makes a request for a print job using GDI, DDI, the printer driver, etc. The printer driver 30 generates print data with the steps described later, then sends the print data to the printer 200. The printer 200 may be called by another name such as a copy machine, a fax machine, etc., if provided with a fax function. In the present embodiment, the printer 200 has at least a fax function. Also, the printer 200 may have an image forming function by electrophotography or by inkjet. Also, the PC 100 and the printer 200 may be directly connected with each other via a USB cable or the like.

The client PC 100 has a CPU 11, a ROM 12, a RAM 13, an external interface 14, a communication device 15, input devices 16, a display controlling section 17, and a storage device 18, which are connected with each other via a bus. The CPU 11 reads the OS 10, the application 31, and the printer driver 30 from the storage device 18 to run these programs using the RAM 13 as a working memory.

The application 31 can be any application that makes a request for a print job to the printer 200. It may be, for example, document creating software, a browser, presentation material generating software, etc. It can be any application that makes a request for printing document data that is created, edited, displayed, or managed by the application. Here, document data not only includes characters, symbols, or numbers, but also images, pictures, or any other printable data.

The RAM 13 is a working memory (main memory) for storing required data. The ROM 12 stores a BIOS, initialized data, a boot program, etc.

The external interface 14 is an interface to be attached to a cable such as a USB cable, or a portable storage medium 20. The communication device 15 is a LAN card or an Ethernet (trademark) card, which sends frame data (primarily print data in the present embodiment) to the printer 200 in response to a direction from the CPU 11.

The input devices 16 are user interface devices such as a keyboard, a mouse, or the like to receive various operations from a user. The input devices may include a touch panel or a voice recognition device. The display controlling section 17 controls displaying on a display 19 with prescribed resolutions or the number of colors based on screen information directed by the application 31. The display 19 may be a FPD (flat panel display) such as an LCD or an organic EL display.

The storage device 18 is a non-volatile memory such as a hard disk drive or a flash memory to store the OS 10, the printer driver 30 and the application 31.

The storage medium 20 is a non-volatile memory such as an SD card, a USB memory, or the like. The printer driver 30 is distributed with the storage medium 20, or with download from a server (not shown).

Figure 9:
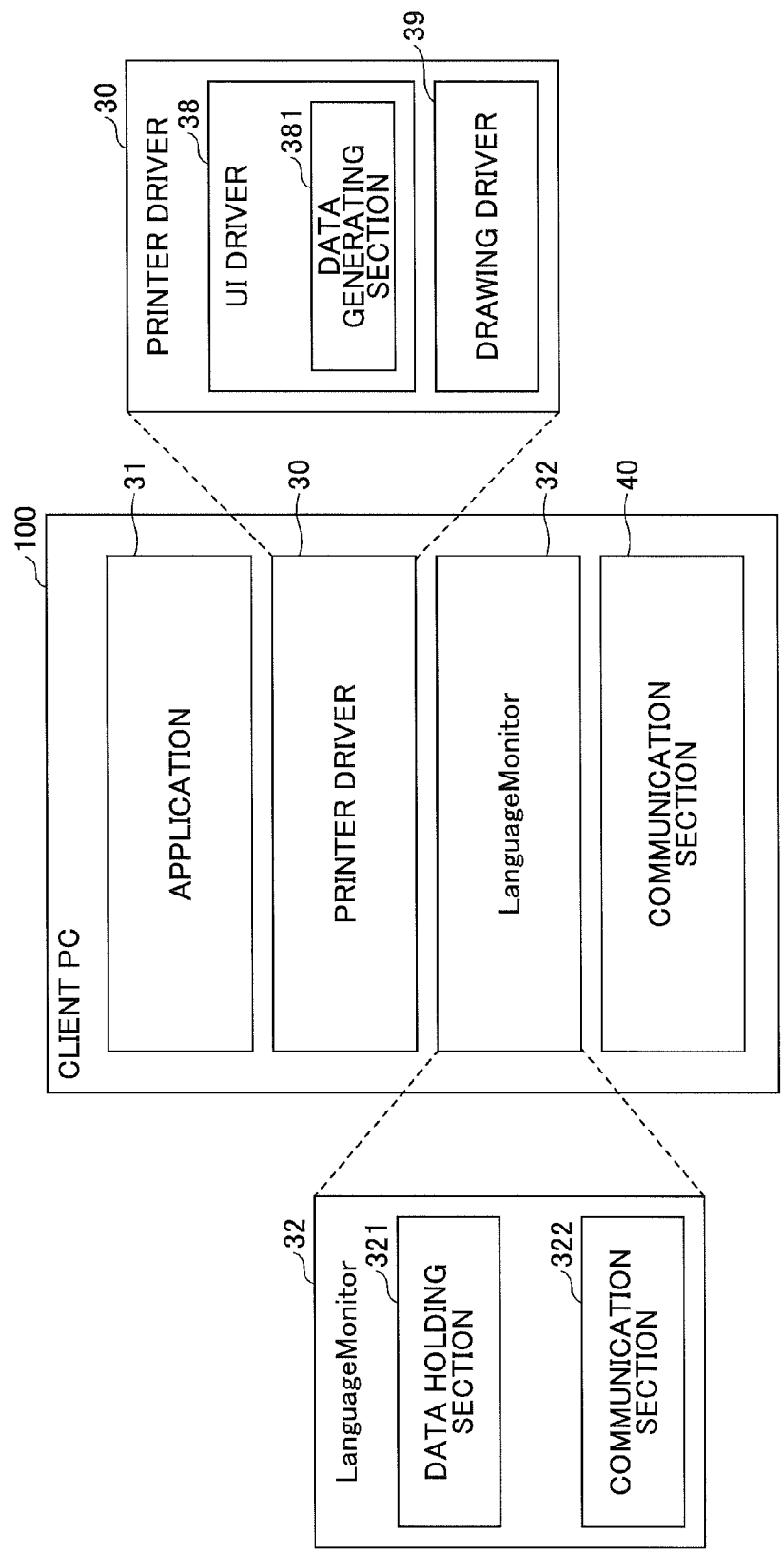
FIG. 9 is a functional block diagram of a client PC and a printer driver.

FIG. 9 is a functional block diagram of the client PC 100 and the printer driver 30. The client PC 100 includes the application 31, the printer driver 30, the language monitor 32 and the communication section 40, which run on a Windows OS. Among these, the language monitor 32 is provided with the Windows OS. Therefore, it can be regarded as a part of a Windows OS in a broad sense. Other than these, a spooler, a printer processor and the like are also installed on the client PC 100 along with the Windows OS, whose explanation is omitted here.

The printer driver has a UI driver 38 and a drawing driver 39. In addition, the UI driver 38 has a data generating section 381. The UI driver 38 displays a sending-setting screen on the display 19 when a user makes a request for sending a document to the application 31. The user can set a fax number, a name, a company name, a division name, and whether to add a cover letter, and the like in the sending-setting screen. If an address book is available, a fax number may be selected from the address book.

Also, the UI driver 38 can accept changes of the sending setting by displaying the sending setting screen on the display 19, after the user has issued a command to start the sending.

Figure 1:
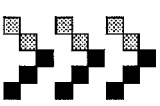
FIG. 1 is a schematic view illustrating an example of a cover letter.
Figure 2:
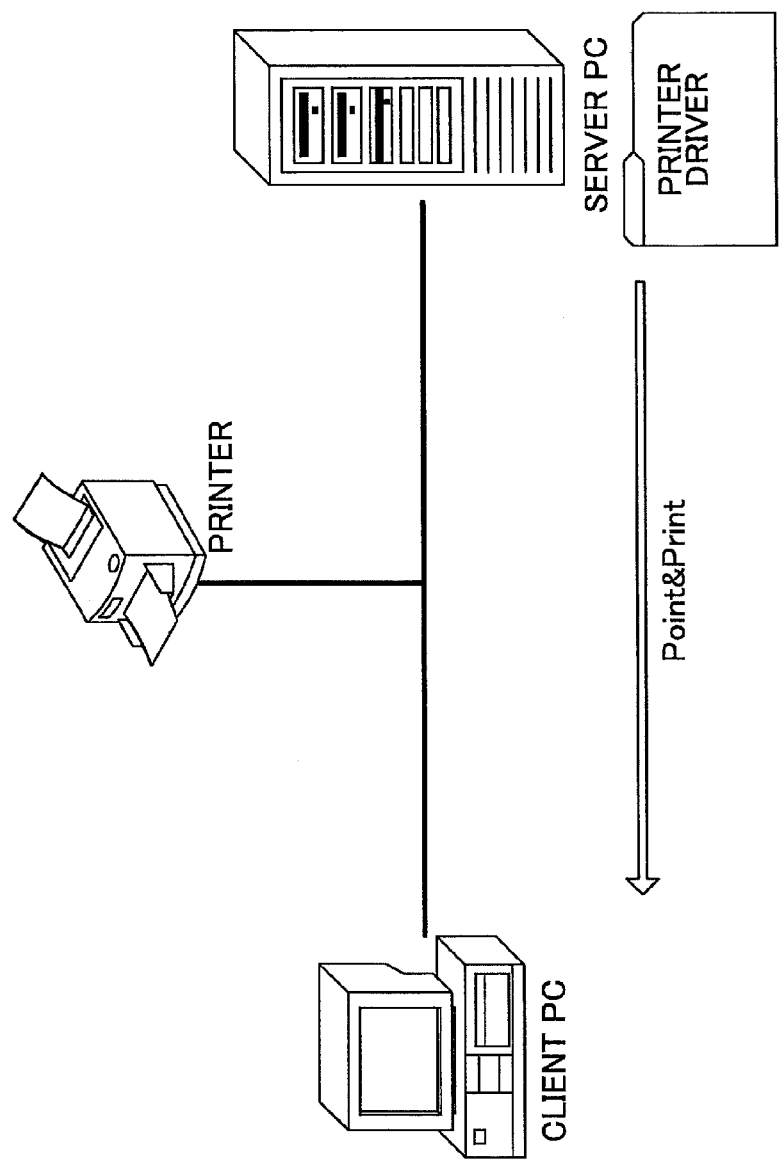
FIG. 2 is a schematic view illustrating Point & Print.
Figure 5:
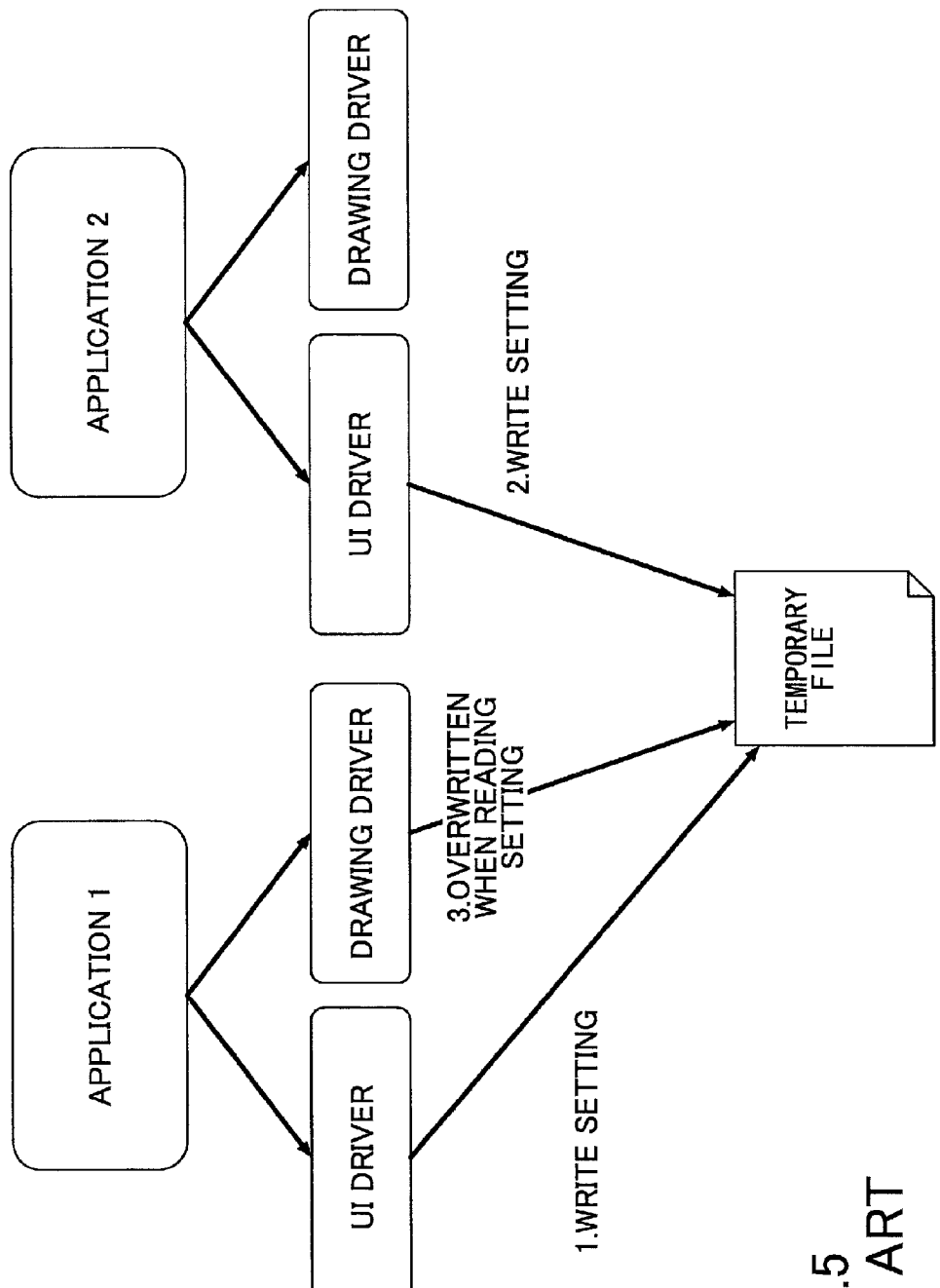
FIG. 5 is a schematic view illustrating a problem with using a temporary file.
Figure 6A:
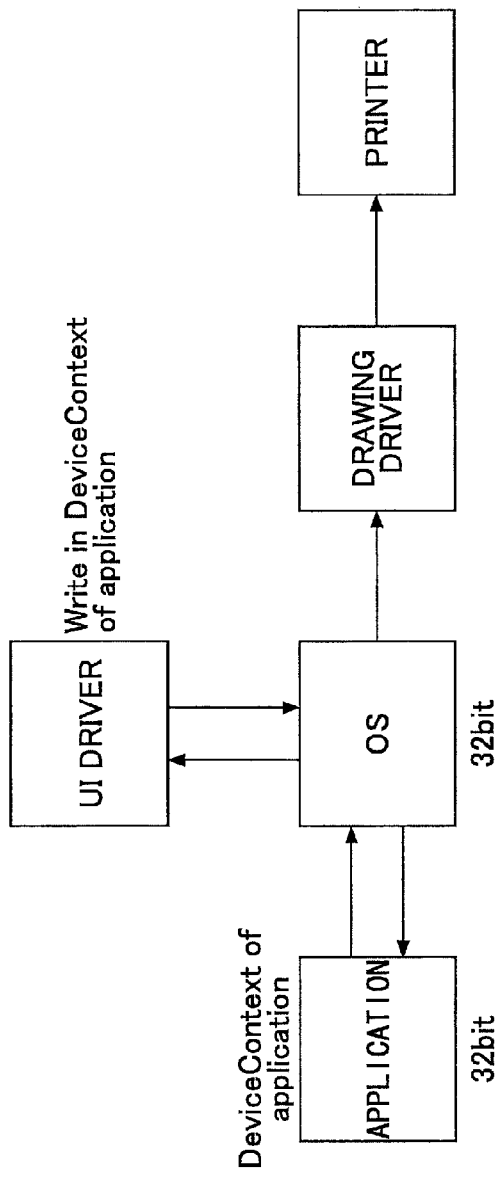
FIGS. 6A-6B are schematic views illustrating methods for adding cover letter data to a device context.
Figure 6B:
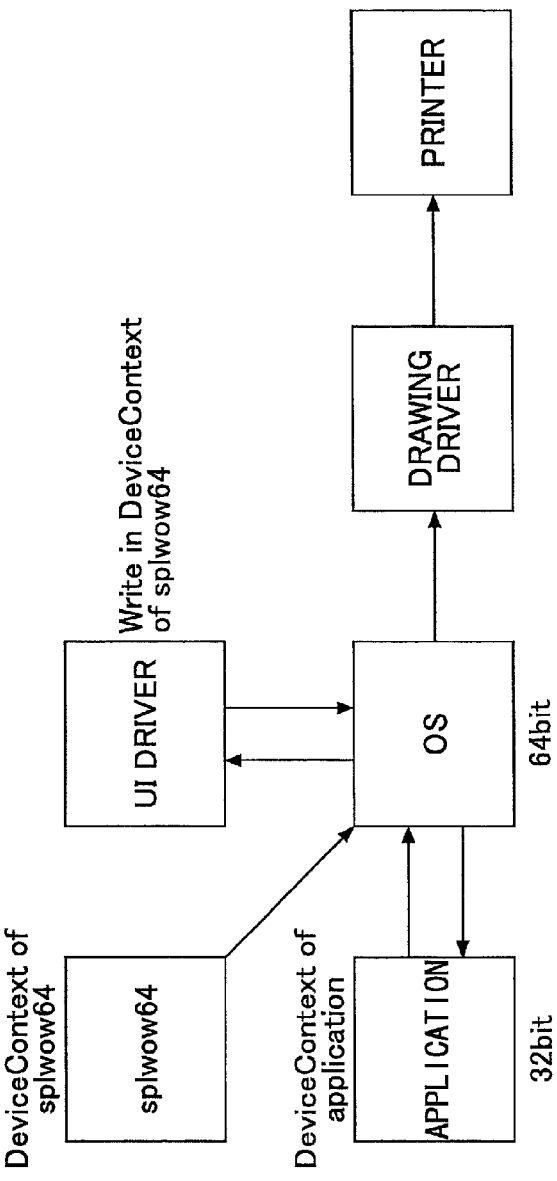

The data generating section 381 generates cover letter data such as the one shown in FIG. 1. Templates for a cover letter are provided beforehand, in which a sender's name, a company name, and a division name; as well as a receiver's fax number, a receiver's name, a company name, and a division name can be supplied at prescribed positions. The data generating section 381 arranges the sending setting set with the sending-setting screen on the template for cover letter data, then converts the arranged template to the drawing data. By preparing the sending-setting screen and the templates in advance, various information can be converted to image data.

Also, the drawing driver 39 does not necessarily need to add the cover letter data in the first page as a cover sheet, but in the second sheet or later. In addition, the cover letter data may be printed on multiple sheets, or the cover letter data may be merged with the document data. For example, all or a part of pages of the document data may be displayed with a message such as "Document sent by fax", or an icon.

It is noted that although cover letter data is not generated generally in a print job, the same UI driver 38 and drawing driver 39 can be commonly used for a print job and a sending job. Therefore, it is possible to print image data generated from a printing setting or a sending setting by a print job.

A sending setting is stored in the structure (data table) called DEVMODE structure (called DEVMODE hereafter). DEVMODE is a data structure in which member variables are defined for commonly set sending conditions of various printer drivers 30 operating on a Windows OS.

By referring to DEVMODE, the drawing driver 39 creates the print data from document data to be printed by the application 31 reflecting the sending setting. Here, the print data includes drawing data (for example, PDL data) and controlling data (for example, a print command of PJL,)

The language monitor 32 has a data holding section 321 and a communication section 322. The communication section 322 controls communication when the printer driver 30 sends the print data to the communication section 40, which is also included in a conventional language monitor 32. The communication section 322 executes send/receive control of data between the language monitor 32 and the communication section 40 of the client PC 100. The communication section 322 can also receive a message from the printer 200 via the communication section 40. On the other hand, the data holding section 321 stores cover letter data using a job ID as a key. The data holding section 321 is implemented with the printer driver 30 using functions of the language monitor 32. Therefore, there is no need to change the Windows OS, or little change if any. The holding section 321 will be described later.

The communication section 40 of the client PC is a section for communicating with the printer 200, which executes communications according to protocols such as TCP/IP.

Figure 10:
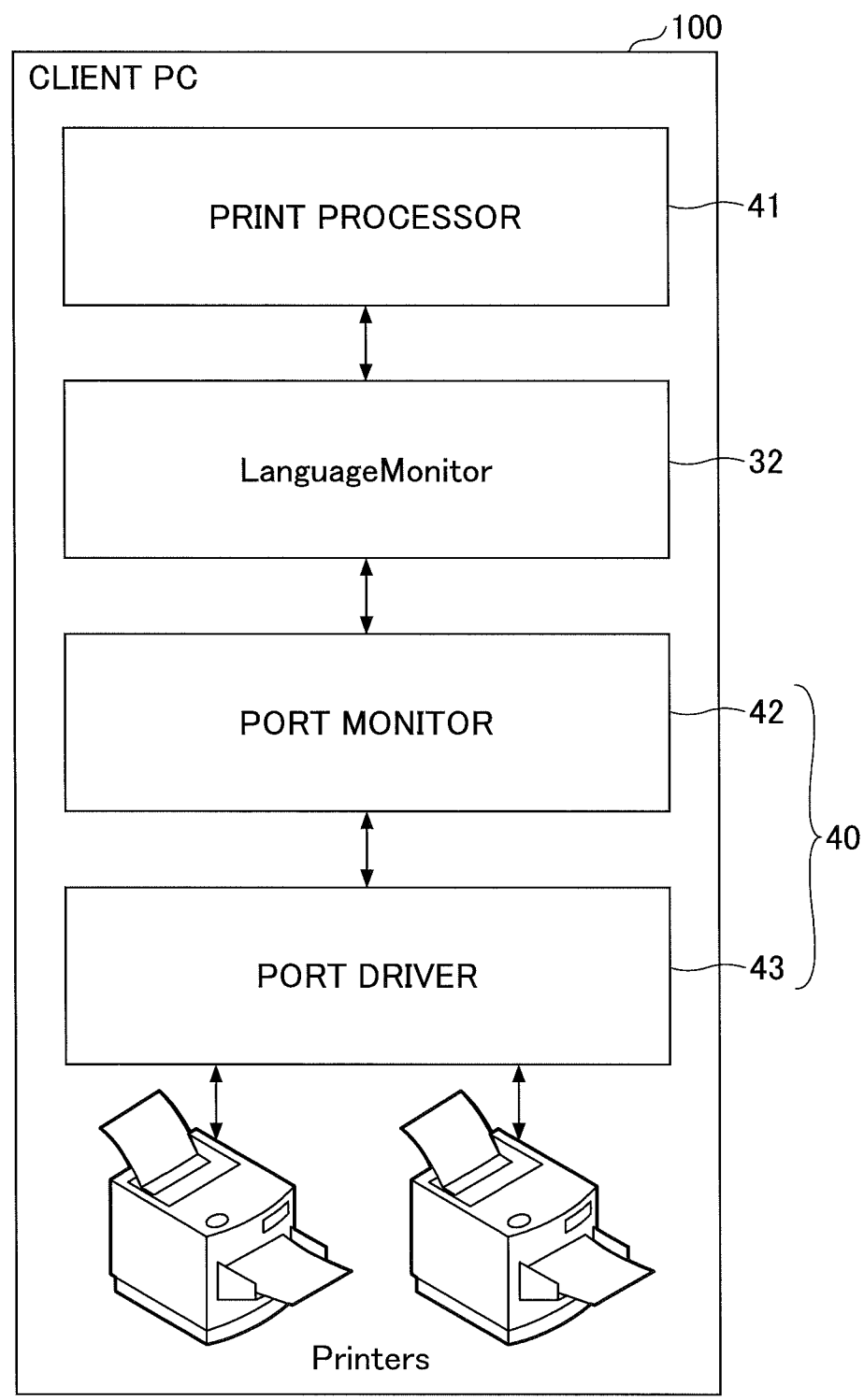
FIG. 10 is a schematic view illustrating behavior of a language monitor.

FIG. 10 is a schematic view illustrating behavior of the language monitor 32. The language monitor 32 receives the print data sent from a print processor 41, sends it to the communication section 40 (a port monitor 42 and a port driver 43). The print processor 41 has a function of a spooler. The print processor 41 executes operations based on a communication protocol to send the print data to the port driver 43. The port driver 43 controls a connection interface (USB, NIC, etc.) between the printer 200 and the client PC 100 to send the print data to the printer 200.

[Conventional Print Architecture of a Windows OS]

Figure 11:
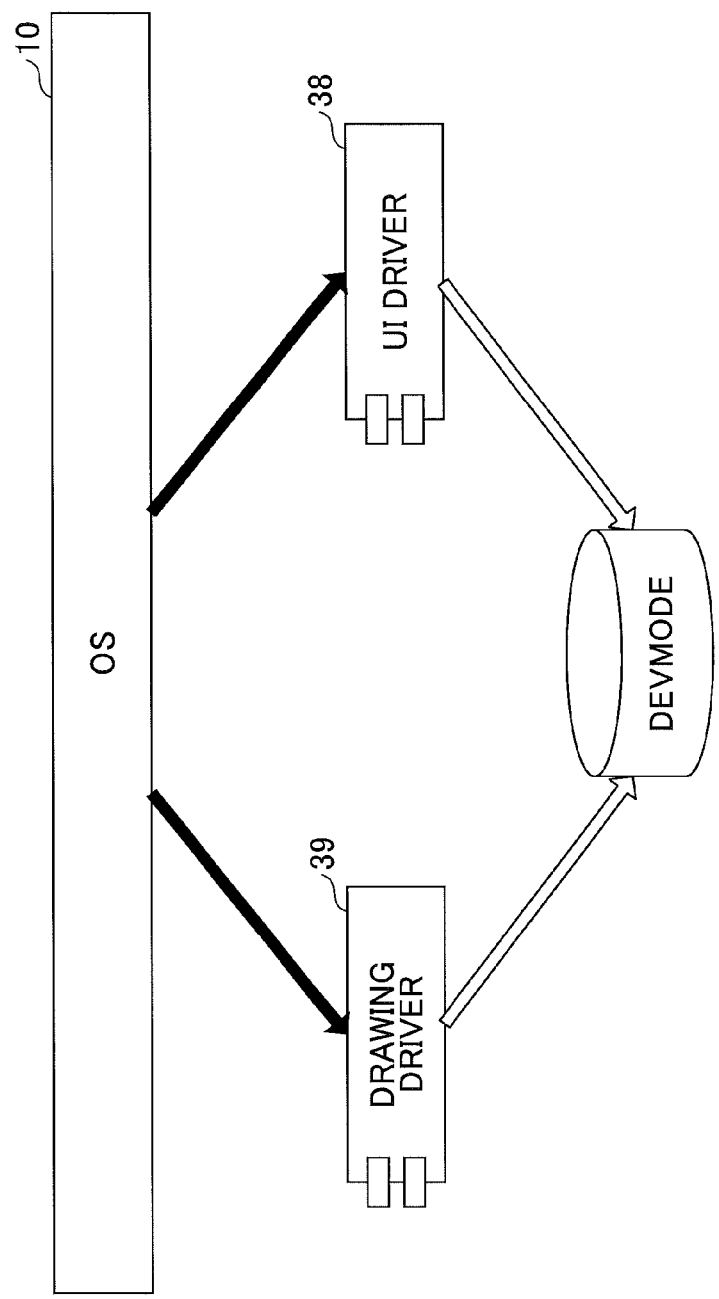
FIG. 11 is a schematic view illustrating a drawing driver and a UI driver in the printing architecture of a Windows OS.

FIG. 11 is a schematic view illustrating the drawing driver and the UI driver in the printing architecture of a Windows OS.

GDI 34 of the Windows OS calls the UI driver 38 and the drawing driver 39 of the printer driver 30 using DDI calls. The UI driver 38 and the drawing driver 39 cannot communicate with each other directly. However, both drivers can refer to DEVMODE because DEVMODE can be specified as an argument when making a call to the driver from the Windows OS.

When called from the Windows OS, the UI driver 38 receives the sending setting of a user to store in DEVMODE.

DEVMODE information is transferred to the drawing driver 39 from the Windows OS when starting a preparation for a print job. Namely, the UI driver 38 determines the sending setting, which is received by the drawing driver 39 when starting the preparation for the print job to generate print commands and drawing data based on the sending setting. This is a basic print sequence in the print architecture of a Windows OS. As the drawing driver 39 starts its operations after the UI driver 38, it is not possible for the general printer driver 30 to change the sending setting after receiving a print start command from a user.

Figure 12:
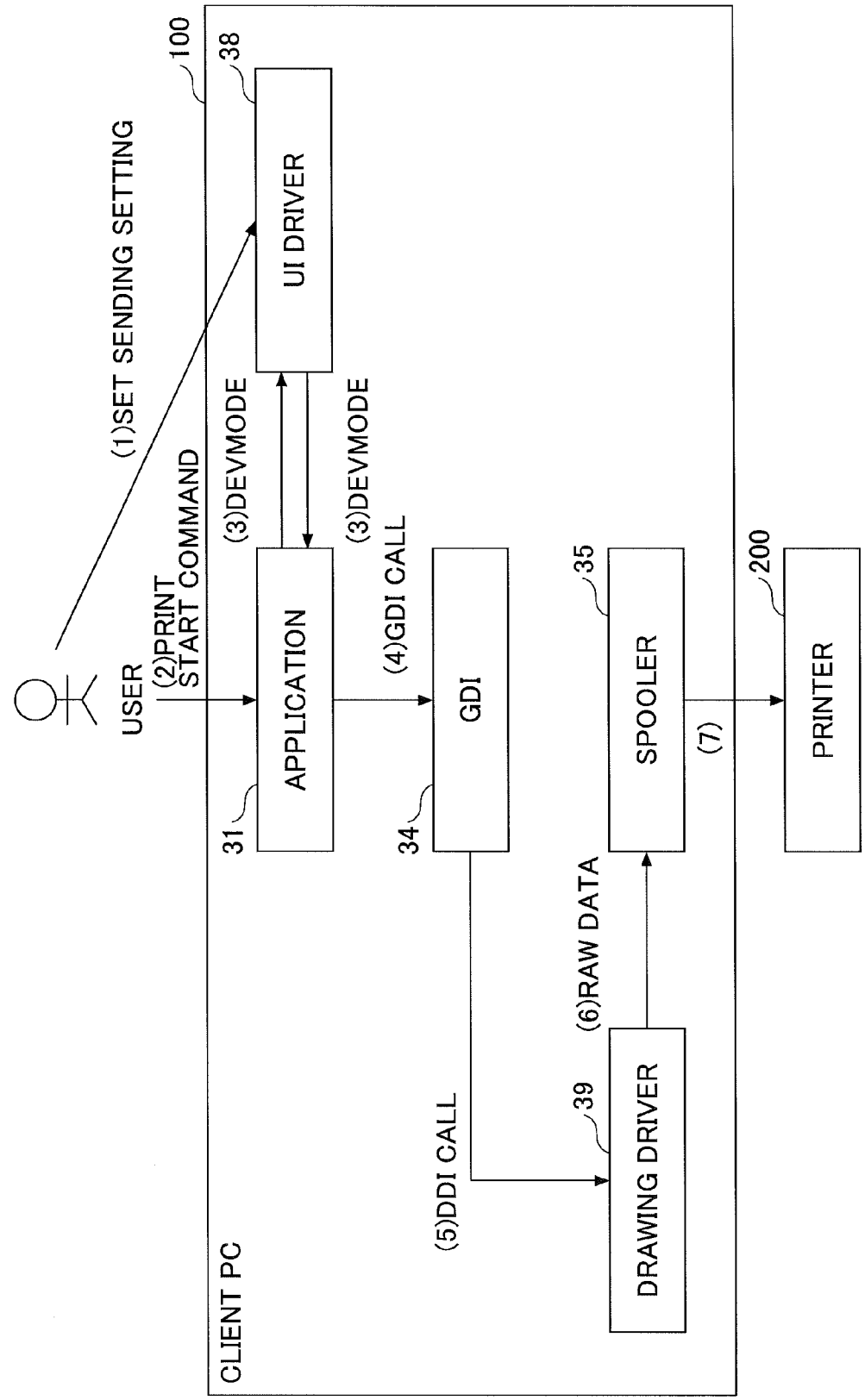
FIG. 12 is a schematic view illustrating a processing flow using RAW spool in the printing architecture of a Windows OS.

FIG. 12 is a schematic view illustrating a processing flow using RAW spool in the printing architecture of a Windows OS.

(1) A user changes the sending setting (changes initial values already registered) with a print dialogue (GUI) provided by the UI driver 38.

(2) The user issues a print start command to the application 31.

(3) The application 31 receives the sending setting from the user by exchanging DEVMODE information including the sending setting with the UI driver 38.

(4) The application 31 transfers the print command and the DEVMODE information to GDI 34 as a GDI call.

(5) GDI 34 converts the GDI call to a DDI call to be transferred to the drawing driver 39.

(6) The drawing driver 39 sends RAW data converted to a language that can be interpreted by the printer 200, to a spooler 35.

(7) The spooler 35 sends the RAW data received from the drawing driver 39 to the printer 200.

Figure 13:
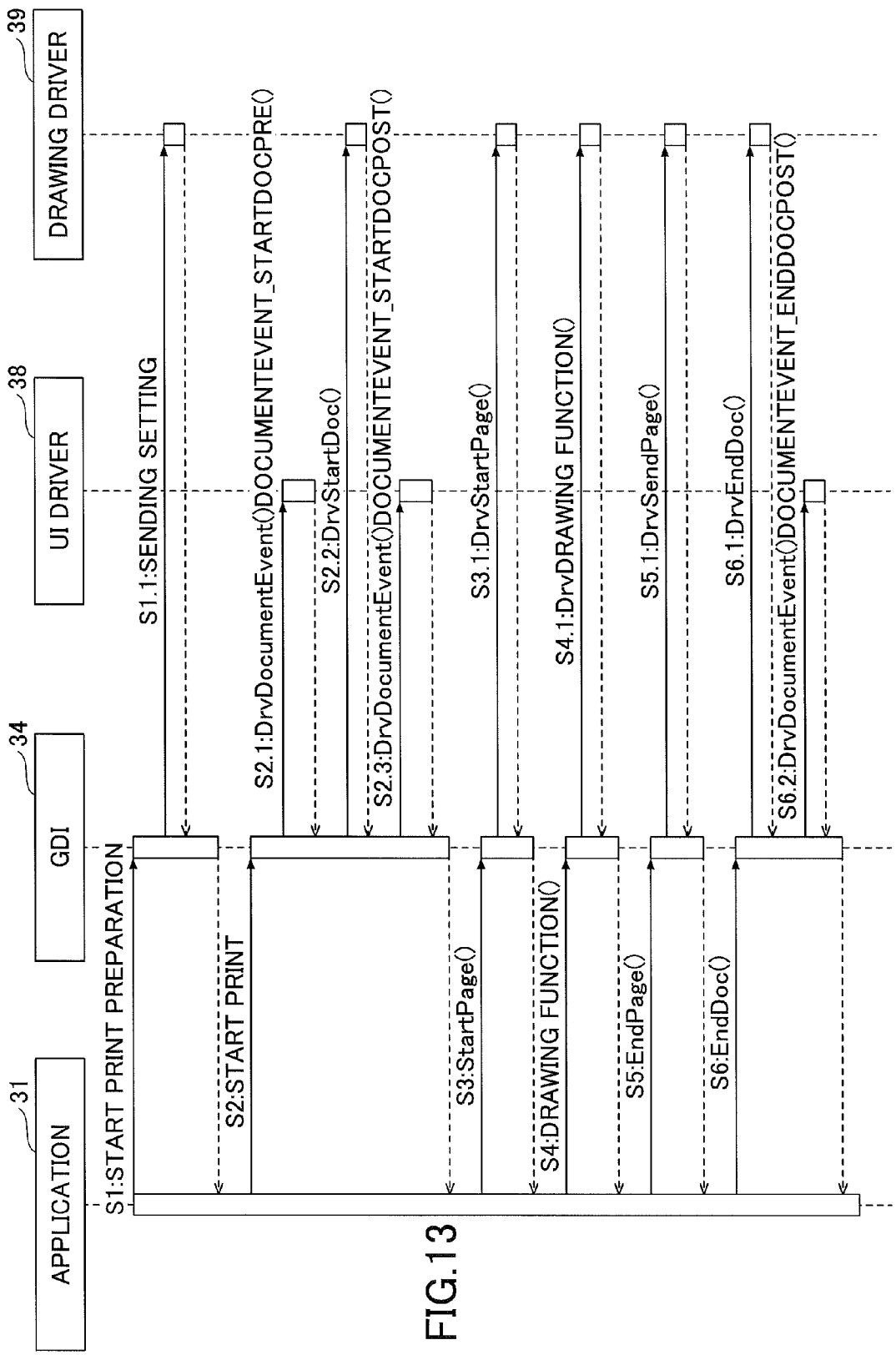
FIG. 13 is a sequence chart in the printing architecture of a Windows OS (RAW spool)

FIG. 13 is a sequence chart in the printing architecture of the Windows OS (RAW spool) related the flow shown in FIG. 12. Here, communications that take place between GDI 34 and the UI driver 38, or between GDI 34 and the drawing driver 39, are not shown. A message from GDI 34 to the UI driver 38 is indicated by a user-interface DDI function, and a message from GDI 34 to the drawing driver 39 is indicated by a drawing DDI function.

Before Step S1 in FIG. 13, the UI driver 38 has received the sending setting set by the user. The sending setting stored in the DEVMODE is obtained by the application 31 that received the print start command from the user.

Step S1: The application 31 directs GDI 34 to start the preparation for the print job. Specifically, the application 31 calls GDI 34 with a function CreateDC( ) having the sending setting (DEVMODE) as an argument.

Step S1.1: GDI 34 sends the sending setting to the drawing driver 39 by calling an API function of DDI. The sending setting, which is transferred from the application 31 to GDI 34 as the argument of CreateDC( ), is stored in an argument of DrvEnablePDEV( ) to be indicated to the drawing driver 39. After that, the drawing driver 39 can refer to the sending setting until the print job is completed (until the device context is deleted).

Step S2: When GDI 34 indicates the completion of the preparation for the print job to the application 31, the application 31 directs GDI 34 to start the print job. Specifically, the application 31 calls GDI 34 with a function StartDoc( ) having DocINFO or the like as an argument.

Step S2.1: GDI 34 directs the UI driver 38 to start the print job. Specifically, GDI 34 sends DrvDocumentEvent( ) DOCUMENTEVENT_STARTDOCPRE( ) to the UI driver 38.

Step S2.2: GDI 34 directs the drawing driver 39 to start the print job. Specifically, GDI 34 sends a function DrvStartDoc( ) to the drawing driver 39. The Windows OS generates a job ID at a predetermined timing with the function CreateDC( ). As GDI 34 sets the job ID as an argument of DrvStartDoc( ), the drawing driver 39 is now able to refer to the job ID.

Step S2.3: Similarly, GDI 34 directs the UI driver 38 to start the print job. Specifically, GDI 34 sends DrvDocumentEvent( ) DOCUMENTEVENT_STARTDOCPOST( ) to the UI driver 38. As GDI 34 sets the job ID as an argument of this function, the UI driver 38 is now able to refer to the job ID.

Step S3: When GDI 34 indicates the completion of the start of the print job to the application 31, the application 31 repeats operations by units of pages. First, the application 31 directs GDI 34 to receive print data for a new page. Specifically, the application 31 sends StartPage( ) to GDI 34.

Step S3.1: GDI 34 sends DrvStartPage( ) to the drawing driver 39.

Step S4: After receiving a response from the drawing driver 39, the application 31 sends a drawing function (document data) to GDI 34.

Step S4.1: GDI 34 sends the drawing function (document data) to the drawing driver 39. The drawing driver 39 converts the document data to the print data according to the sending setting.

Step S5: After GDI 34 has indicated to the application 31 the completion of the drawing operation of one page of the document data, the application 31 indicates to GDI 34 that the write operation of the one page is completed. Specifically, the application 31 sends EndPage( ) to GDI 34.

Step S5.1: GDI 34 indicates to the drawing driver 39 that the write operation of the one page is completed. Specifically, GDI 34 sends DrvSendPage( ) to the drawing driver 39.

Step S6: After completing the drawing operation of all the pages, the application 31 indicates the completion of the print job to GDI 34. Specifically, the application 31 sends EndDoc( ) to GDI 34.

Step S6.1: GDI 34 indicates the completion of the print job to the drawing driver 39. Specifically, GDI 34 sends EndDoc( ) to the drawing driver 39.

Step S6.2: GDI 34 indicates the completion of the print job to the UI driver 38. Specifically, GDI 34 sends DrvDocumentEvent( ) DOCUMENTEVENT_ENDDOCPOST( ) to the UI driver 38.

After that, the device context is deleted (the application 31 indicates DeleteDC( ) to GDI 34) so that the drawing driver 39 cannot refer to the sending setting anymore (the drawing driver 39 is advised that a DDI call with DrvDisablePDEV( ) has been made).

Figure 14:
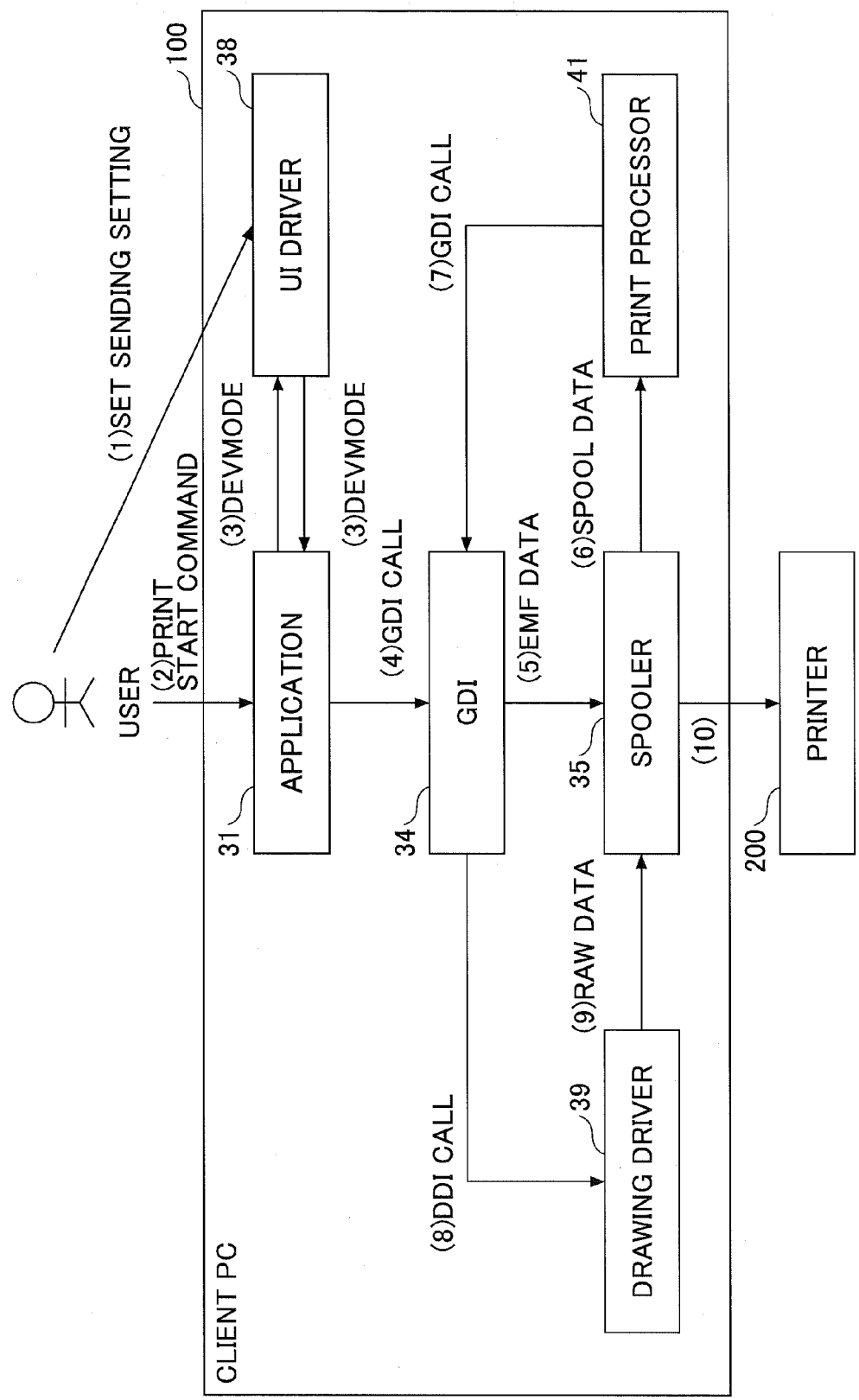
FIG. 14 is a schematic view illustrating a processing flow using EMF spool in the printing architecture of a Windows OS.

FIG. 14 is a schematic view illustrating the processing flow using EMF spool in the printing architecture of the Windows OS.

(1) The user changes the sending setting (changes in initial values already registered) with the print dialogue (GUI) provided by the UI driver 38.
(2) The user issues a print start command to the application.
(3) The application receives the sending setting from the user by exchanging via DEVMODE information including the sending setting with the UI driver 38.
(4) The application transfers the print command and the DEVMODE information to GDI 34 as a GDI call.
(5) GDI 34 transfers the EMF data as spool data to the spooler 35.
(6) After the print data of the application 31 has been spooled, the spooler 35 indicates to the print processor 41 that the data is to be unspooled and transfers the spool data to the print processor 41.
(7) The print processor 41 edits the spooled data page by page for summarizing, reverse ordering or publishing purposes, which is indicated to GDI 34 with a GDI call.
(8) GDI 34 converts the GDI call to a DDI call to send to the drawing driver 39.
(9) The drawing driver 39 converts RAW data into the language that can be interpreted by the printer, then sends it to the spooler 35.
(10) The spooler 35 sends the RAW data received from the drawing driver 39 to the printer 200.

FIG. 15 is a sequence chart in the printing architecture of the Windows OS (EMF spool). Here, communications that take place between GDI 34 and the UI driver 38, or between GDI 34 and the drawing driver 39, are not shown. With EMF spool, the sequence is divided into an application process and a spooler process.

Before Step S1 in FIG. 15, the UI driver 38 has received the sending setting set by the user. The sending setting stored in the DEVMODE is obtained by the application 31 that received the print start command from the user. Which spool, RAW spool or EMF spool, is used is set in the sending setting.

Step S1: The application 31 directs GDI 34 to start a preparation for a print job. Specifically, the application 31 calls GDI 34 with the function CreateDC( ) having the sending setting as an argument.

Step S1.1: GDI 34 sends the sending setting to the drawing driver 39 by calling an API function of DDI. The sending setting, which is transferred from the application 31 to GDI 34 as the argument of CreateDC( ), is stored in an argument of DrvEnablePDEV( ) to be indicated to the drawing driver 39. After that, the drawing driver 39 can refer to the sending setting until the job is completed (until the device context is deleted).

Step S2: When GDI 34 indicates the completion of the preparation for the print job to the application 31, the application 31 directs GDI 34 to start the print job. Specifically, the application 31 calls GDI 34 with a function StartDoc( ) having DocINFO or the like as an argument.

Step S2.1: GDI 34 directs the UI driver 38 to start the print job. Specifically, GDI 34 sends DrvDocumentEvent( ) DOCUMENTEVENT_STARTDOC( ) to the UI driver 38.

Step S2.2: GDI 34 sends the drawing driver 38 the job ID. Specifically, GDI 34 sends DrvDocumentEvent( ) DOCUMENT_STARTDOCPOST( ) to the UI driver 38. As GDI 34 sets the job ID as an argument of this function, the UI driver 38 is now able to refer to the job ID. At this moment, the drawing driver 39 has not obtained the job ID yet.

Step S3: when GDI 34 indicates the completion of the start of the print job to the application 31, the application 31 repeats operations by units of pages. First, the application 31 directs GDI 34 to receive print data for a new page. Specifically, the application 31 sends StartPage( ) to GDI 34, with which a spooler process starts.

Step S4: The application 31 sends a drawing function (document data) to GDI 34. GDI 34 generates EMF data according to the sending setting.

Step S5: The application 31 indicates to GDI 34 that a write operation of one page is completed. Specifically, the application 31 sends EndPage( ) to GDI 34.

Step S6: After completing the drawing of all the pages, the application 31 indicates the completion of the print job to GDI 34. Specifically, the application 31 sends EndDoc( ) to GDI 34.

Thus, after the completion of the application process, the print job seems to be completed from the application 31 point of view even if the printing has not actually completed yet. After that, the spooler process executes the rest of the print job where EMF data is converted to RAW data.

A Window OS monitors communications between the application 31 and GDI 34 to have the spooler 35 start a spooler process at a predetermined timing, for example, after StartPage( ).

Step S7: The spooler 35 directs the print processor 41 to start a preparation for the print job. Specifically, the spooler 35 sends PrintDocumentOnPrintProcessor( ) to the print processor 41.

Step S7.1: The print processor 41 directs GDI 34 to start a preparation for the print job. Specifically, the print processor 41 sends GetJobAttributes( ) to GDI 34.

Step S7.1.1: GDI 34 sends the sending setting to the drawing driver 39. Specifically, the sending setting (DEVMODE), which has been transferred from the application 31 to GDI 34 as an argument of CreateDC( ), is stored as an argument of DrvEnablePDEV( ) to be indicated to the drawing driver 39.

After that, the drawing driver 39 can refer to the sending setting until the job is completed (until the device context is deleted).

Step S7.1.2: GDI 34 directs the drawing driver 39 to start the print job. Specifically, GDI 34 sends DrvStartDoc( ) to the drawing driver 39. The Windows OS generates a job ID at a predetermined timing with the function CreateDC( ). As GDI 34 sets the job ID as an argument of DrvStartDoc( ), the drawing driver 39 is now able to refer to the job ID.

Step S7.2: The print processor 41 repeats operations by units of pages. First, the print processor 41 directs GDI 34 to receive print data for a new page. Specifically, the print processor 41 sends GdiStartPageEMF( ) to GDI 34.

Step S7.2.1: GDI 34 sends DrvStartPage( ) to the drawing driver 39.

Step S7.2.2: GDI 34 sends a drawing function (document data) to the drawing driver 39. The drawing driver 39 converts the document data to the print data according to the sending setting.

Step S7.2.3: GDI 34 indicates the completion of the write operation of the new page to the drawing driver 39. Specifically, GDI 34 sends DrvSendPage( ) to the drawing driver 39.

After that, the operations are repeated by units of pages.

[Print Architecture of Windows OS in the Present Embodiment]

Figures 16A, 16B:
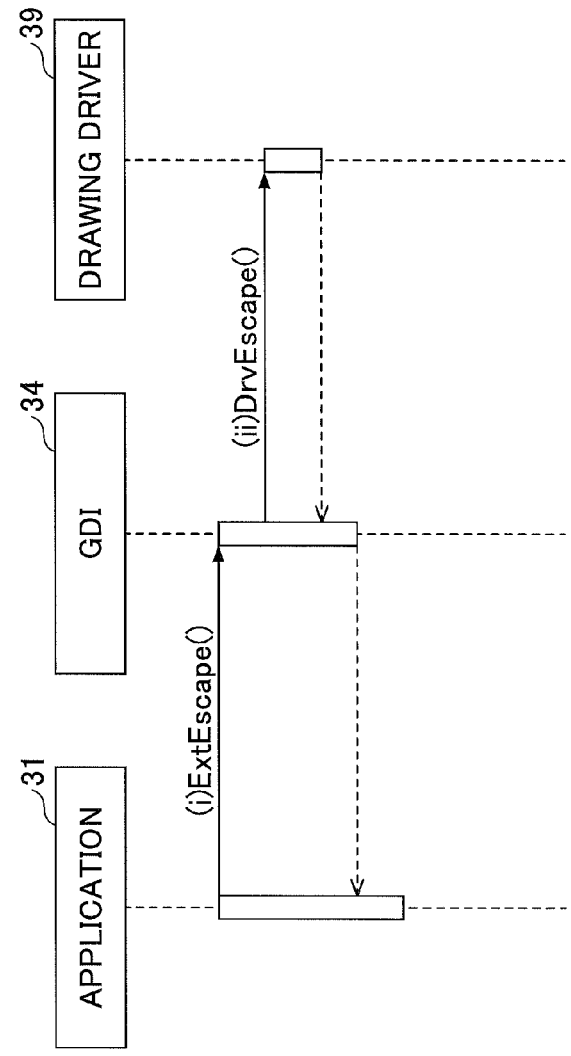
FIG. 16A is a schematic view illustrating a format of function ExtEscape( )
FIG. 16B is a sequence chart of a function ExtEscape( )

Next, the print architecture of a Windows OS will be described according to the present embodiment. First, API and the like used in the print architecture in the present embodiment will be described. FIG. 16A is a schematic view illustrating a format of function ExtEscape( ). ExtEscape( ) is an API function for accessing a specific module (corresponding to a block in a sequence chart or a functional block diagram) that cannot be accessed through GDI. This function may be used if the application 31 sends data to the driver without using GDI 34, or the application 31 obtains data from a module without using GDI 34.

hdc is a handle of a device context.

nEscape is an argument for checking or setting a functionality of ExtEscape( ).

cbInput is the size of a structure sent with ExtEscape( ).

lpszInData is a pointer to a structure sent with ExtEscape( ).

cbOutput is the size of the structure receiving the structure sent by ExtEscape( ).

lpszOutData is a pointer to a structure receiving the structure sent by ExtEscape( ).

ExtEscape( ) is an API function that can be called with respect to a device context generated by CreateDC( ). Therefore, the UI driver 38 or the like can call ExtEscape( ) as long as there exists a device context processed in a sequence.

FIG. 16B is a sequence chart of ExtEscape( ) when called from the application 31.

(i) The application 31 calls GDI 34 with ExtEscape( ).

(ii) GDI 34 converts ExtEscape( ) to a DDI call, DrvEscape( ), to indicate to the drawing driver 39.

Also, on the contrary, the drawing driver 39 or the UI driver 38 can call ExtEscape( ). ExtEscape( ) can be called from a module between CreateDC( ) and DeleteDC( ), the sequence shown in FIG. 16B can be inserted to any position in the previous sequence charts shown in FIG. 13 or 15.

FIG. 17A is a schematic view illustrating a format of function DrvDocumentEvent( ). DrvDocumentEvent( ) is a DLL for processing a specific event related to printing of document data.

hPrinter is a handle of a printer.

hdc is a handle of a device context.

iEsc is an escape code to distinguish an event to be processed provided by a calling module.

cbIn is the size of data sent by pvIn.

pvIn is a pointer to the sent data.

cbOut stores a value specified with the function as a cbOutput parameter of ExtEscape( ) if iEsc is DOCUMENTEVENT_ESCAPE, or stores the size of the structure pvOut received by a receiver if iEsc is DOCUMENTEVENT_QUERYFILTER.

pvOut is a pointer to the structure out received by the receiver.

In the present embodiment, DrvDocumentEvent( ) is called at an appropriate timing during a DDI call in which GDI 34 or the like calls the UI driver 38 during a print job after CreateDC( ). As DrvDocumentEvent( ) is a DDI call executing an individual operation, it cannot share data with a previous or later call of DrvDocumentEvent( ). This point differs from a DDI calling the drawing driver 39. DrvDocumentEvent( ) is a user-interface DDI that can display a print dialog screen, or can generate data such as a cover letter.

Also, since it has an argument of device context handle (hdc), after calling DDI with DrvDocumentEvent( ), a module can call an API requiring a device context. For example, if the UI driver 38 calls a drawing API with an argument of a device context, the UI driver 38 can indicate a drawing instruction to the corresponding drawing driver 39.

FIG. 17B is a schematic view illustrating a format of function SendRecvBidiDataFromPort( ). SendRecvBidiDataFromPort( ) is a function implemented in the language monitor 32. The language monitor 32 has interface functions determined by the Windows OS as determined for the printer driver 30. SendRecvBidiDataFromPort( ) is one of them, which supports bidirectional communications between an application 31 and a printer, or between an application 31 and a print server.

hPort is a handle of a port given by a calling module.

dwAccessBit is an ACCESS_MASK structure for permitting an access to a printer or a print server, given by a calling module.

pAction is a request action given by a calling module.

pReqData is a pointer to a PBIDI_REQUEST_CONTAINER structure that has request data.

ppResData is a pointer to a memory location for receiving an address of a PBIDI_RESPONSE_CONTAINER structure that has response data.

FIG. 18A is a schematic view illustrating a format of the structure PBIDI_REQUEST_CONTAINER. The structure PBIDI_RESPONSE_CONTAINER has substantially the same format. The structure PBIDI_REQUEST_CONTAINER is a container to store a list of "bidi requests", whereas the structure PBIDI_RESPONSE_CONTAINER is a container to store a list of "bidi RESPONSEs".

A Windows OS provides a database schema, called "Bidi Request and Response Schemas", providing pairs of request and response that can be used for bidirectional communications between a printer and an application 31.

version is a version of the schema, for example, 1.

Flags are a set of flags reserved for a system (a Windows OS), whose values must be zero.

Count is the number of "bidi requests" at aData member.

aData[ ] is an array of BIDI_REQUEST_DATA structures, in which each element has a "bidi request".

FIG. 18B is a schematic view illustrating a format of the structure BIDI_REQUEST_DATA. A BIDI_REQUEST_DATA structure stores a "bidi request".

dwReqNumber is an index of requests, which is used for matching multiple operational requests and responses.

pSchema is a pointer to a memory location that stores the first byte of a schema string.

data is a BIDI_DATA structure according to a schema.

<Storing Job ID and Cover Letter Data in Language Monitor>

Conventionality, a Windows OS generates a unique ID (job ID) for a print job in a receiving order of print start commands. Either with RAW spool or with EMF spool, there is a step in which the drawing driver 39 or the UI driver 38 obtains the job ID. Namely, the drawing driver 39 can receive the job ID as an argument of DrvStartDoc( ). The UI driver 38 can receive the job ID as an argument of DrvDocumentEvent( ) DOCUMENTEVENT_STARTDOCPOST( ).

Figure 19:
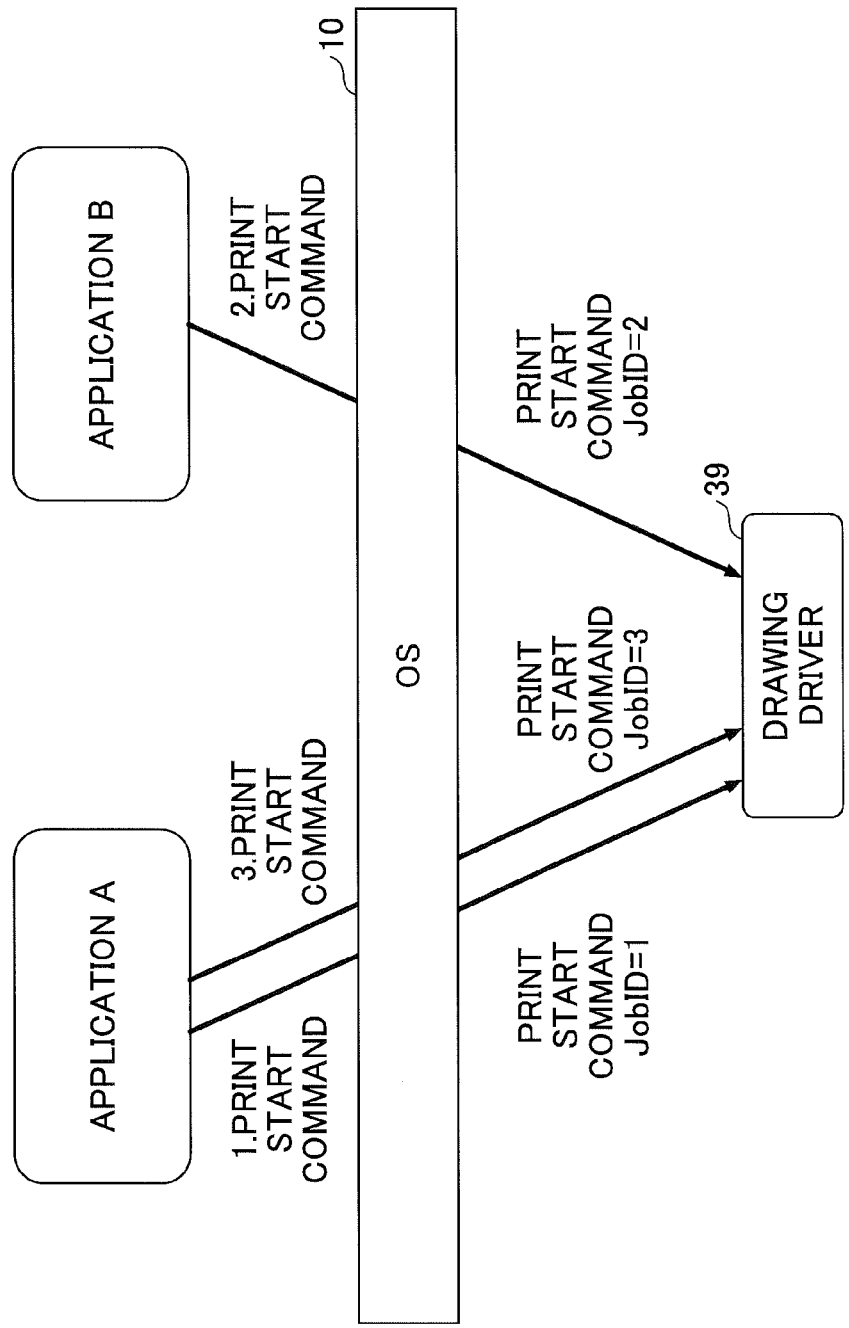
FIG. 19 is a schematic view illustrating job IDs assigned by a Windows OS.

FIG. 19 is a schematic view illustrating job IDs assigned by a Windows OS. An application A and an application B issue print start commands 1 to 3 arbitrarily.

Here, the Windows OS assigns the job ID 1 to the print start command 1 from the application A, assigns the job ID 2 to the print start command 2 from the application B, and assigns the job ID 3 to the print start command 3 from the application A.

The drawing driver 39 or the UI driver 38 obtains these b IDs whose uniquenesses are guaranteed.

In the present embodiment, cover letter data is stored in the language monitor 32 using the job ID as a key.

Figure 20:
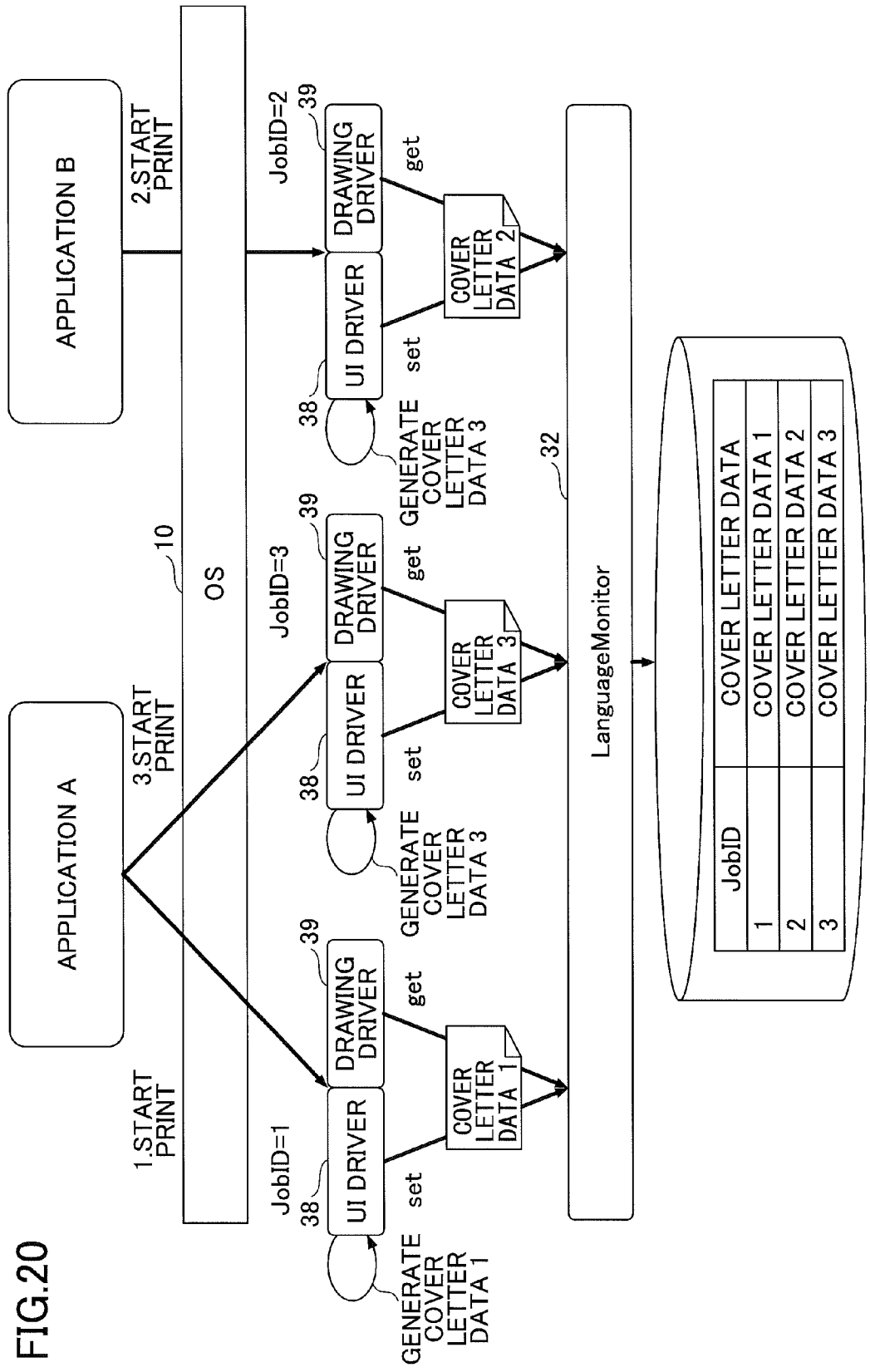
FIG. 20 is a schematic view illustrating job IDs and sending settings stored in a language monitor.

FIG. 20 is a schematic view illustrating job IDs and cover letter data stored in the language monitor 32. The applications A and B start print jobs as follows. Job IDs are assigned by the Windows OS in this order of print jobs.

1. The application A starts a print job with setting the cover letter adding function ON.
2. The application B starts a print job with setting the cover letter adding function ON.
3. The application A starts a print job with setting the cover letter adding function ON.

The UI driver 38 receives a sending setting by displaying a sending-setting screen after a print job has started. The UI driver 38 generates the cover letter data because the cover letter adding function is set ON. Then, the UI driver 38 associates the sending setting with the cover letter data, which is stored in the language monitor 32 with the job ID as a key. As shown in FIG. 20, the language monitor 32 may store pairs of the job ID and the cover letter data in a table-like structure to associate the job ID with the cover letter data.

The drawing driver 39 sends a query about the cover letter data to the language monitor 32 with the job ID as a key when the cover letter data is required.

As above, a unique key is assigned to a print job by the Windows OS, which is used for storing information by the language monitor 32. Therefore, if multiple applications start multiple sending jobs arbitrarily, the printer driver 30 can manage cover letter data for each of the sending jobs. Thus, by using a function of the Windows OS, non-overlapping job IDs among print jobs can be used as keys in the data holding section 321 of the language monitor 32.

SendRecvBidiDataFromPort( ) is used for setting in and querying to the language monitor 32. Once the printer driver 30 calls the language monitor 32 with SendRecvBidiDataFromPort( ), the language monitor 32 can be used as a storage for cover letter data. Namely, the data holding section 321 is implemented in the language monitor 32 with using SendRecvBidiDataFromPort( ).

As above, the standard language monitor 32 built in a Windows OS is available even if a specific language monitor 32 is not provided by a manufacturer of a printer or the like. If the manufacturer does not develop the language monitor 32, the standard language monitor 32 can be used. The manufacturer may add unique functions if it is willing to develop a language monitor 32 following predetermined interfaces. In the present embodiment, it is possible for the printer driver 30 or the like to exchange data with the language monitor 32 using an interface function called SendRecvBidiDataFromPort( ).

Specifically, a job ID is set in SetSchema( ) of IBidiRequest, which is an instance of COM interface. Cover letter data is set in SetInputData( ) of IBidiRequest. When the UI driver 38 calls SendRecv( ) with setting an IBidiRequest object, a spooler calls SendRecvBidiDataFromPort( ) to set the job ID and the cover letter data in the language monitor 32. The job ID is set, for example, in the third argument, pAction, of SendRecvBidiDataFromPort( ), and the cover letter data is set in the fourth argument, pReqData.

When the drawing driver 39 reads the cover letter data, the drawing driver 39 calls SendRecv( ) with setting an IBidiRequest object to store the cover letter data in the IBidiRequest. Then, the drawing driver 39 can obtain the cover letter data by calling GetOutputData( ) of the IBidiRequest.

While neither of the UI driver 38 nor the drawing driver 39 directly calls SendRecvBidiDataFromPort( ), it can be regarded that they actually call SendRecvBidiDataFromPort( ).

<Operational sequence>

RAW Spool

Figure 21:
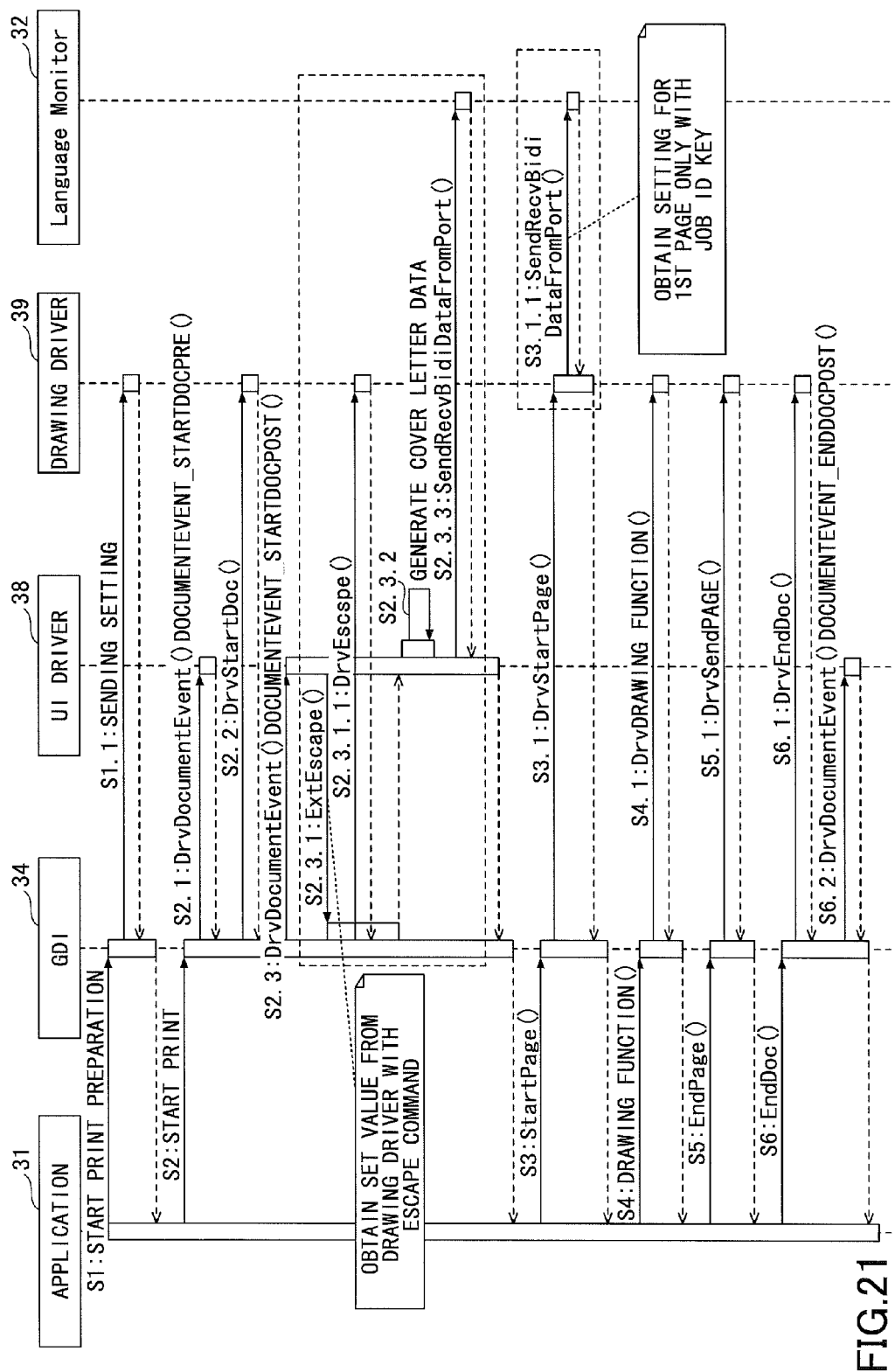
FIG. 21 is a sequence chart for RAW spool in the printing architecture of a Windows OS.

FIG. 21 is a sequence chart for RAW spool in the printing architecture of a Windows OS. Here, communications that take place between GDI 34 and the UI driver 38, or between GDI 34 and the drawing driver 39, are not shown. A message from GDI 34 to the UI driver 38 is indicated by a user-interface DDI function, and a message from GDI 34 to the drawing driver 39 is indicated by a drawing DDI function.

Before Step S1 in FIG. 20, the UI driver 38 has received the sending setting set by the user. The sending setting stored in a DEVMODE is obtained by the application 31 that received a print start command from the user.

Step S1: the application 31 directs GDI 34 to start a preparation for a print job. Specifically, the application 31 calls GDI 34 with a function CreateDC( ) having the sending setting as an argument.

Step S1.1: GDI 34 sends the sending setting to the drawing driver 39 by calling an API function of DDI. The sending setting, which is transferred from the application 31 to GDI 34 as an argument of CreateDC( ), is stored in an argument of DrvEnablePDEV( ), to be indicated to the drawing driver 39. After that, the drawing driver 39 can refer to the sending setting until the job is completed (until the device context is deleted).

Step S2: when GDI 34 indicates the completion of the preparation for the print job to the application 31, the application 31 directs GDI 34 to start the print job. Specifically, the application 31 calls GDI 34 with a function StartDoc( ) having DocINFO or the like as an argument.

Step S2.1: GDI 34 directs the UI driver 38 to start the print job. Specifically, GDI 34 sends DrvDocumentEvent( ) DOCUMENTEVENT_STARTDOCPRE( ) to the UI driver 38.

Step S2.2: GDI 34 directs the drawing driver 39 to start the print job. Specifically, GDI 34 sends a function DrvStartDoc( ) to the drawing driver 39. The Windows OS generates a job ID at a predetermined timing with the function CreateDC( ). As GDI 34 sets the job ID as an argument of the DrvStartDoc( ), the drawing driver 39 is now able to refer to the job ID.

Step S2.3: Similarly, GDI 34 directs the UI driver 38 to start the print job. Specifically, GDI 34 sends DrvDocumentEvent( ) DOCUMENTEVENT_STARTDOCPOST( ) to the UI driver 38. As GDI 34 sets the job ID as an argument of this function, the UI driver 38 is now able to refer to the job ID.

Step S2.3.1: Here, the data generating section 381 needs to refer to the sending setting to generate (or to determine whether to generate) cover letter data, but the data generating section 381 cannot directly communicate with the drawing driver 39. Therefore, the data generating section 381 sends ExtEscape( ) to GDI 34.

Step S2.3.1.1: GDI 34 indicates DrvEscape( ) to the drawing driver 39. The drawing driver 39 sends the sending setting that the drawing driver 39 holds to the UI driver 38 via GDI 34.

Step S2.3.2: By executing ExtEscape( ), the UI driver 38 now obtains the sending setting. If cover letter data is specified to be generated in the sending setting, the UI driver 38 generates the cover letter data such as the one shown in FIG. 1. If the sending setting is specified to be redisplayed or modified in the sending setting, the sending setting is displayed again.

Step S2.3.3: When the user closes the print dialog, the UI driver 38 sends the cover letter data associated with the job ID as a key to the language monitor 32 with SendRecvBidiData-FromPort( )::set. Here, "::" means that "DOCUMENTEVENT" is abbreviated. Thus, the language monitor 32 can store the cover letter data associated with the job ID. At this moment, the way the user closed the print dialog, "OK", or "Cancel", is also sent.

Step S3: When GDI 34 indicates the completion of the start of the print job to the application 31, the application 31 repeats the operations by units of pages. First, the application 31 directs GDI 34 to receive print data for a new page. Specifically, the application 31 sends StartPage( ) to GDI 34.

Step S3.1: GDI 34 sends DrvStartPage( ) to the drawing driver 39.

Step S3.1.1: The drawing driver 39 makes a request for the cover letter data to the language monitor 32 with SendRecvBidiDataFromPort( )::get using the job ID as a key, only when receiving the first DDI call with DrvStartPage( ). Here, the language monitor 32 holds information about the way the user closed the print dialog, "OK", or "Cancel". The drawing driver 39 generates the print data according to the sending setting if the user has closed with "OK". The drawing driver 39 does not send data to a FAX device if the user has closed with "Cancel".

Step S4: After receiving a response from the drawing driver 39, the application 31 sends a drawing function (document data) to GDI 34. Step S4.1: GDI 34 sends the drawing function (document data) to the drawing driver 39. The drawing driver 39 converts the document data to the print data according to the sending setting. The rest of the steps are similar as before. Therefore, the description is omitted.

Thus, the drawing driver 39 can obtain the cover letter data uniquely identified with a job ID from the language monitor 32.

EMF Spool

Figure 22:
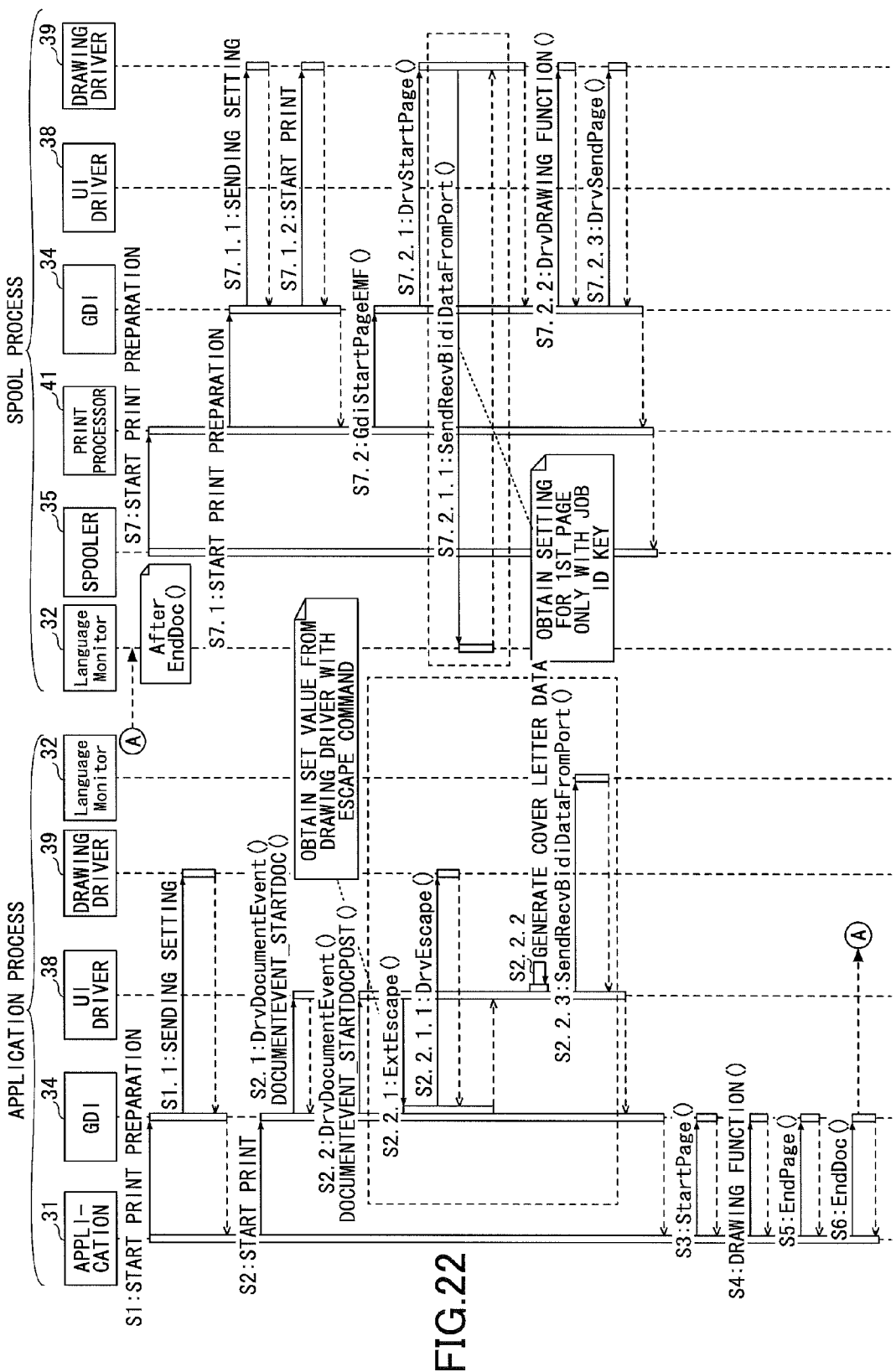
FIG. 22 is a sequence chart for EMF spool in the printing architecture of a Windows OS.

FIG. 22 is a sequence chart for EMF spool in the printing architecture of a Windows OS. Here, communications that take place between GDI 34 and the UI driver 38, or between GDI 34 and the drawing driver 39, are not shown.

Before Step S1 in FIG. 22, the UI driver 38 has received the sending setting set by the user. The sending setting stored in a DEVMODE is obtained by the application 31 that received the print start command from the user.

Step S1: the application 31 directs GDI 34 to start a preparation for a print job. Specifically, the application 31 calls GDI 34 with function CreateDC( ) having the sending setting as an argument.

Step S1.1: GDI 34 sends the sending setting to the drawing driver 39 by calling an API function of DDI. The sending setting, which is transferred from the application 31 to GDI 34 as an argument of CreateDC( ), is stored in an argument of DrvEnablePDEV( ) to be indicated to the drawing driver 39. After that, the drawing driver 39 can refer to the sending setting until the job is completed (until the device context is deleted).

Step S2: When GDI 34 indicates the completion of the preparation for the print job to the application 31, the application 31 directs GDI 34 to start the print job. Specifically, the application 31 calls GDI 34 with function StartDoc( ) having DocINFO or the like as an argument.

Step S2.1: GDI 34 directs to the UI driver 38 to start the print job. Specifically, GDI 34 sends DrvDocumentEvent( ) DOCUMENTEVENT_STARTDOC( ) to the UI driver 38.

Step S2.2: GDI 34 sends the job ID to the UI driver 38. Specifically, GDI 34 sends DrvDocumentEvent( ) DOCUMENTEVENT_STARTDOCPOST( ) to the UI driver 38. As GDI 34 sets the job ID as an argument of this function, the UI driver 38 is now able to refer to the job ID. At this moment, the drawing driver 39 has not obtained the job ID yet.

Step S2.2.1: Here, the UI driver 38 calls GDI 34 with ExtEscape( ) with the device context as an argument, to determine whether cover letter data needs to be generated.

Step S2.2.1.1: GDI 34 makes a request for the sending setting held by the drawing driver 39, by sending a DDI call with DrvEcape( ) to the drawing driver 39. The drawing driver 39 sends the sending setting that the drawing driver 39 holds to the UI driver 38 via GDI 34.

Step S2.2.2 By executing ExtEscape( ), the UI driver 38 now obtains the sending setting. If cover letter data is specified to be generated in the sending setting, the UI driver 38 generates the cover letter data such as the one shown in FIG. 1. If the sending setting is specified to be redisplayed or modified in the sending setting, the sending setting is displayed again.

Step S2.2.3: When the user closes the print dialog, the UI driver 38 sends the cover letter data associated with the job ID as a key to the language monitor 32 with SendRecvBidiDataFromPort( )::set. Thus, the language monitor 32 can hold the cover letter data associated with the job ID. At this moment, the way the user closed the print dialog, "OK", or "Cancel", is also sent.

The following Steps S3 to S6 are the same as those outlined above. Therefore, the description is omitted. With the steps described above, the application process completes its role in the print job (generation of the EMF data).

After that, a process of the spooler 35 executes the rest of the print job in which the EMF data is converted to RAW data. The Windows OS monitors communications between the application 31 and GDI 34 to have the spooler 35 start the spooler process at a predetermined timing, for example, after StartPage( ).

Step S7: The spooler 35 directs the print processor 41 to start a preparation for a print job.

Step S7.1: The print processor 41 directs GDI 34 to start a preparation for the print job.

Step S7.1.1: GDI 34 sends the sending setting to the drawing driver 39. Specifically, the sending setting, which has been transferred from the application 31 to GDI 34 as an argument of CreateDC( ), is stored as an argument of DrvEnablePDEV( ) to be indicated to the drawing driver 39. After that, the drawing driver 39 can refer to the sending setting until the job is completed (until the device context is deleted).

Step S7.1.2: GDI 34 directs the drawing driver 39 to start the print job. Specifically, GDI 34 sends DrvStartDoc( ) to the drawing driver 39. The Windows OS generates a job ID at a predetermined timing with the function CreateDC( ). As GDI 34 sets the job ID as an argument of DrvStartDoc( ), the drawing driver 39 is now able to refer to the job ID.

Step S7.2: The print processor 41 repeats the operations by units of pages. First, the print processor 41 directs GDI 34 to receive print data for a new page. Specifically, the print processor 41 sends GdiStartPageEMF( ) to GDI 34.

Step S7.2.1: GDI 34 sends DrvStartPage( ) to the drawing driver 39.

Step S7.2.1.1: The drawing driver 39 makes a request for the cover letter data to the language monitor 32 with SendRecvBidiDataFromPort( )::get using the job ID as a key, only when receiving the first DDI call with DrvStartPage( ). Here, the language monitor 32 holds information about the way the user closed the print dialog, "OK", or "Cancel", at Step S2.2.2. The drawing driver 39 generates print data according to the sending setting if the user has closed with "OK". The drawing driver 39 does not send data to a FAX device if the user has closed with "Cancel".

Step S7.2.2: GDI 34 sends a drawing function (document data) to the drawing driver 39. The drawing driver 39 converts the document data to print data according to the sending setting.

Step S7.2.3: GDI 34 indicates the completion of the write operation of the new page to the drawing driver 39. Specifically, GDI 34 sends DrvSendPage( ) to the drawing driver 39. After that, the operations are repeated by units of pages.

As described above, by holding the cover letter data with a job ID as a key in the language monitor 32, there is no risk of an overwrite if another job generates the cover letter data after the first print job has started at EMF spool.

There are seeming differences between the print sequences in FIGS. 21 and 22 due to different spool formats. However, the operations executed in each of the following functions are the same for RAW spool and EMF spool:

DrvEnablePDEV( )
DrvStartDoc( )
DrvStartPage( )
DrvEscape( )

of the drawing driver 39,

DrvDocumentEvent( ) DOCUMENTEVENT_STARTDOCPOST( )

of the UI driver 38,
and

SendRecvBidiDataFromPort( )::set
SendRecvBidiDataFromPort( )::get of the language monitor 32.

Therefore, cover letter data can be managed regardless of the spool formats according to the present embodiment. Also, in an environment where multiple applications operate, by using the language monitor 32, it is possible to send cover letter data without being destructed by other applications. In addition, compatibility with Windows OSes is maintained because the drawing driver 39 does not generate cover letter data.

<Case with 32-Bit Application Running on 64-Bit OS>

If the application is a 32-bit application and the Windows OS is a 64-bit OS, there are cases where the UI driver 38 operates as a process of splwow64.exe with WOW64. Even if the application is a 32-bit application, it is possible for the drawing driver 39, which is a 64-bit process here, to access the language monitor 32 to obtain cover letter data, because the UI driver 38 records a job ID and cover letter data in the language monitor 32 running as a 64-bit process.

Specifically, the application 31 is replaced with splwow64.exe, and the application process is replaced with a splwow64 process, which results in no changes in the sequence charts shown in FIGS. 21 and 22.

Therefore, it is possible for the device driver in the present embodiment to send a cover letter without losing compatibility with OSes, and without being affected the by differences between spool formats (RAW spool, EMF spool), installing methods (local installation, Point&Print installation), and OSes (32-bit OS, 64-bit OS).

Second Embodiment

In the present embodiment, management of cover letter data using the language monitor 32 in a Point & Print environment will be described.

Figure 23:
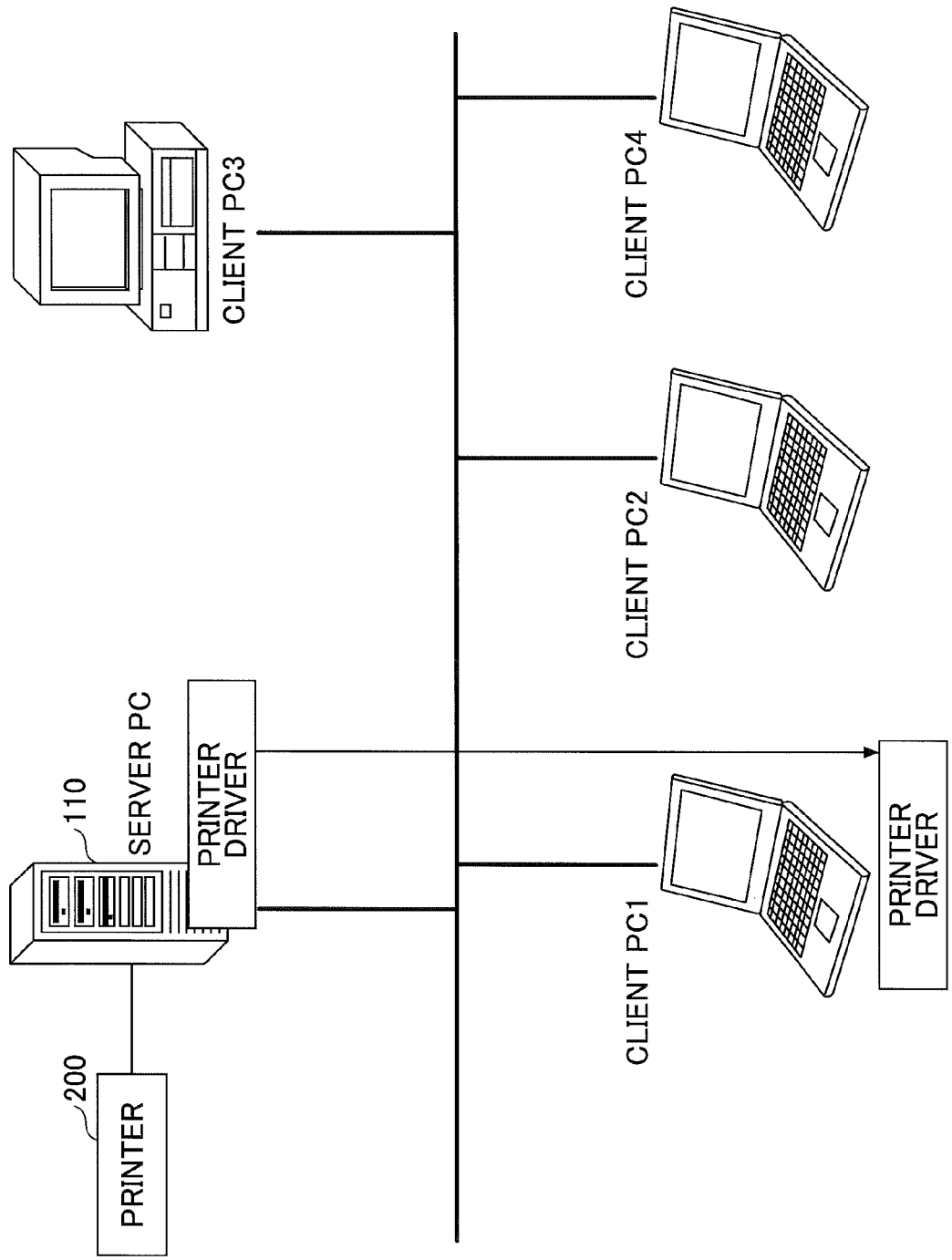
FIG. 23 is a generic configuration diagram of a printing system provided with Point & Print.

FIG. 23 is a generic configuration diagram of a printing system provided with Point & Print. Four client PCs 1-4 are connected with a server PC 110 via a network. A printer 200 is connected with the server PC 110, which may be connected via a network.

The printer driver 30 is installed in the server PC 110, which is copied and distributed to the client PCs 1-4 by the server PC 110. Therefore, without a user's intervention, the printer driver 30 can be installed by a cooperation of the server PC 110 and the client PCs 1-4. In the following, it is assumed that the client PC 1 is connected with the server PC 110, and the printer driver 30 is installed by Point & Print.

With server-side rendering in a Point & Print environment, it is difficult to share a sending setting because a client PC receives a user's sending setting and a server PC executes the drawing operations.

On the other hand, in the present embodiment, the client PC 1 and the server PC 110 exchange a sending setting and cover letter data using the language monitor 32 in the printing architecture provided by the Windows OS. Therefore, the server PC 110 can obtain cover letter data from the client PC 1 within the printing architecture.

Figure 24:
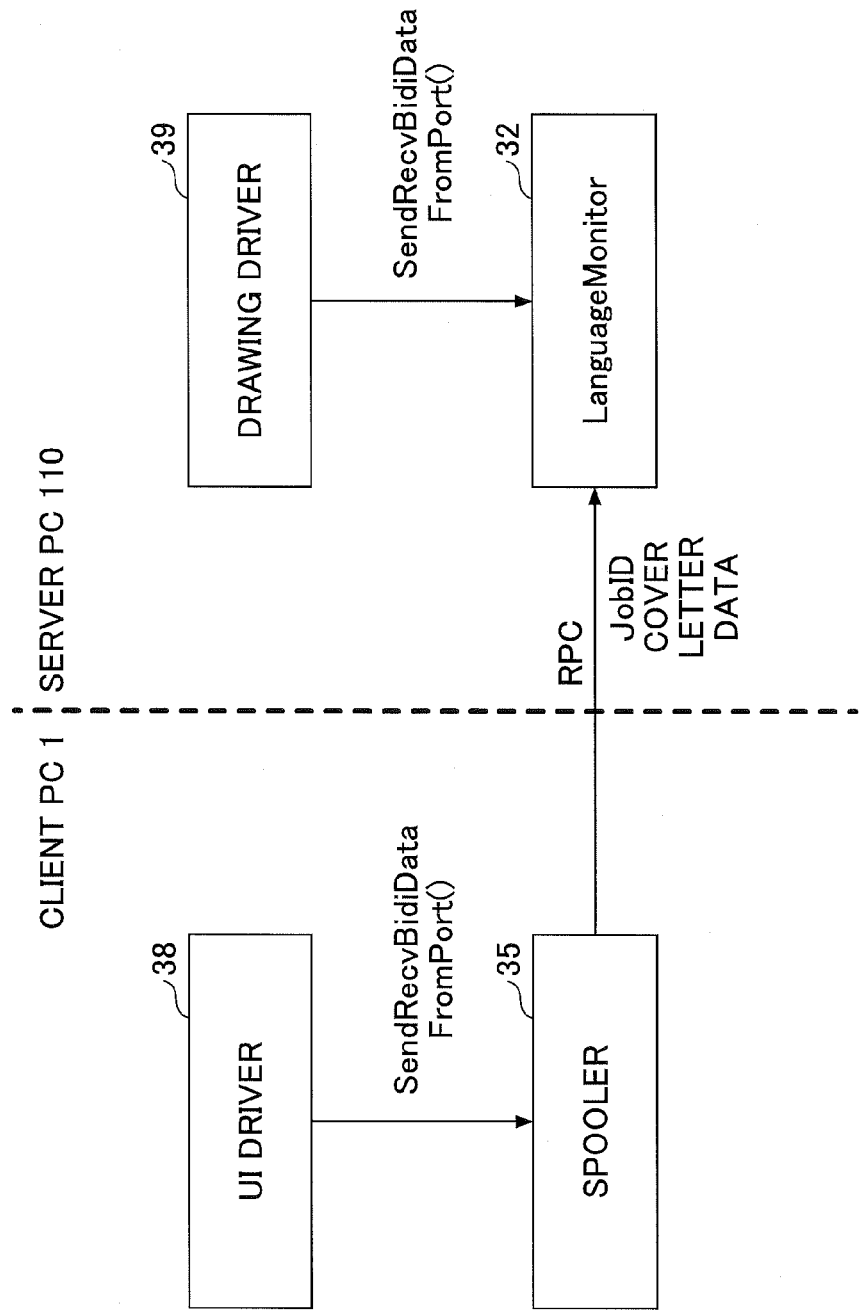
FIG. 24 is a schematic view illustrating operations of language monitor in a Point & Print environment.

FIG. 24 is a schematic view illustrating operations of the language monitor 32 in the Point & Print environment. The language monitor 32 is a module built into the printing architecture of the Windows OS. Therefore, if the UI driver 38 runs on the client PC 1 and the drawing driver 39 runs on the server PC 110 with Point & Print, the language monitor 32 runs only on the server PC 110. Although the language monitor 32 is also installed on the client PC 1, it does not operate in this case.

Therefore, the UI driver 38 on the client PC 1 and the drawing driver 39 on the server PC 110 access the single language monitor 32.

The Windows OS for the client PC 1 and the Windows OS for the server PC 110 establish a communication route for the client PC 1 and the server PC 110 (for example, RPC (remote procedure call) is used).

As both of the client PC 1 and the server PC 110 have installed the Windows OS, respectively, they can commonly use the language monitor 32 provided in the printing architecture of the Windows OS. Therefore, an access right error or a communication error is unlikely to happen, which could be likely to happen if using a module independently developed by a third-party manufacturer. For the same reason, it is highly compatible with Windows OSes.

It is noted that although Point & Print supports RAW spool and EMF spool, server-side rendering is not provided for RAW spool. This is because a PC to execute rendering is restricted because RAW spool is an application process.

For other cases, namely client-side rendering with RAW spool, client-side rendering with EMF spool, and server-side rendering with EMF spool, the language monitor 32 can be used as shown in FIG. 24.

If a 32-bit application runs on a 64-bit OS, splwow64.exe runs on the client PC1. Therefore, the job ID and the cover letter data are stored in the 64-bit language monitor 32 in the server PC 110 as in the first embodiment.

As described above, in the printing system 400 according to the present embodiment, it is possible to send a cover letter without being affected by differences between spool formats, installing methods, and OSes.

Further, the present invention is not limited to these embodiments, but various variations and modifications may be made without departing from the scope of the present invention.

The present application is based on Japanese Priority Application No. 2012-062742 filed on Mar. 19, 2012, with the Japanese Patent Office, the entire contents of which are hereby incorporated by reference.

What is claimed is:

1. A non-transitory computer-readable recording medium having programs stored therein for causing a computer to execute a method of controlling a print job of document data generated by an application, the programs including
    a controlling program to control an execution of the print job of the document data generated by the application, by assigning an ID to the print job,
    a setting receiving program to display a screen for receiving a setting condition for the print job from a user,
    an image processing program to obtain the document data from the application to be converted into print data based on the setting condition received by the setting receiving program, and
    a print data processing program to store the ID of the print job associated with image data,
    the method comprising the steps of:
    (a) obtaining the ID of the print job from the controlling program, the step being executed by the setting receiving program;
    (b) generating the image data if a command for generating the image data is specified in the setting condition, the step being executed by the setting receiving program;
    (c) storing the ID of the print job associated with the image data into the print data processing program, the step being executed by the setting receiving program;
    (d) obtaining the document data from the application, and the ID from the controlling program, the step being executed the image processing program;
    (e) receiving the image data associated with the ID stored in the print data processing program via the controlling program, the step being executed by the image processing program; and
    (f) converting the image data and the document data into the print data according to the setting condition, the step being executed by the image processing program.

2. The non-transitory computer-readable recording medium as claimed in claim 1, the method further comprising the steps of:
    sending the setting condition to the image processing program, after receiving the setting condition from the user and before generating the image data, the step being executed by the setting receiving program;
    making a request to the controlling program to send the setting condition from the image processing program, the step being executed by the setting receiving program; and
    having the controlling program send the setting condition, the step being executed by the image processing program,
    wherein step (b) further obtains the setting condition from the controlling program for the setting receiving program.

3. The non-transitory computer-readable recording medium as claimed in claim 1,
    wherein step (b) is executed after being directed to start the print job by the controlling program, before the image processing program converts the document data to the print data.

4. The non-transitory computer-readable recording medium as claimed in claim 1,
    wherein the ID is of a unique job among multiple print jobs or fax sending jobs controlled by the controlling program, the ID being generated while prescribed steps for the print job are being executed.

5. The non-transitory computer-readable recording medium as claimed in claim 1,
    wherein step (c) is executed with a prescribed API function provided by the controlling program to store the setting condition into the print data processing program having the ID as a key.

6. The non-transitory computer-readable recording medium as claimed in claim 1,
    wherein step (d) is executed with a prescribed API function provided by the controlling program to read the setting condition stored in the print data processing program having the ID as a key.

7. The non-transitory computer-readable recording medium as claimed in claim 1,
    wherein in step (b), the image data of a cover letter is generated from the setting condition including information about a sender and a receiver of a facsimile.

8. The non-transitory computer-readable recording medium as claimed in claim 1, the method further comprising:
    adding the image data as a cover on the print data converted from the document data, or adding the image data as a part of the print data including one or more pages, the step being executed by the image processing program.

9. An information processing apparatus comprising:
    a controlling section to control an execution of a print job of document data generated by an application, by assigning an ID to the print job;
    a setting receiving section to display a screen for receiving a setting condition for the print job from a user;
    an image processing section to obtain the document data from the application to be converted into print data based on the setting condition received by the setting receiving section; and
    a print data processing section to store the ID of the print job associating with image data,
    wherein the setting receiving section includes an image data generating section to generate the image data if a command for generating the image data is specified in the setting condition,
    wherein the setting receiving section associates the ID assigned to the print job with the image data generated at the image data generating section, to store the image data associated with the ID into the print data processing section, and
    wherein the image processing section obtains the document data from the application, the ID from the controlling section, and the image data associated with the ID from the print data processing section, to convert the image data and the document data into the print data according to the setting condition.

10. The information processing apparatus as claimed in claim 9,
wherein the setting receiving section sends the setting condition to the image processing section, after receiving the setting condition from the user and before generating the image data,
wherein the image data generating section makes a request to the controlling section to send the setting condition from the image processing section,
wherein the image processing section sends the setting condition to the controlling section, and
wherein the image data generating section obtains the setting condition from the controlling section.

11. The information processing apparatus as claimed in claim 9,
wherein the image data generating section generates the image data, after being directed to start the print job by the controlling section, before the image processing section converts the document data to the print data.

12. The information processing apparatus as claimed in claim 9,
wherein the ID is of a unique job among multiple print jobs controlled by the controlling program, the ID being generated while prescribed steps for the print job are being executed.

13. The information processing apparatus as claimed in claim 9,
wherein the controlling section further includes a prescribed API function to store the setting condition into the print data processing section having the ID as a key, and
wherein the setting receiving section calls the prescribed API function to store the setting condition.

14. The information processing apparatus as claimed in claim 9,
wherein the controlling section further includes a prescribed API function to read the setting condition stored in the print data processing section having the ID as a key, and
wherein the image processing section calls the prescribed API function to read the setting condition.

15. The information processing apparatus as claimed in claim 9,
wherein the image data generating section generates the image data of a cover letter from the setting condition including information about a sender and a receiver of a facsimile.

16. The information processing apparatus as claimed in claim 9,
wherein the image processing section adds the image data as a cover on the print data converted from the document data, or adds the image data as a part of the print data including one or more pages.

* * * * *